United States Patent
Kaku et al.

(10) Patent No.: US 6,914,404 B2
(45) Date of Patent: Jul. 5, 2005

(54) MOTOR CONTROLLER

(75) Inventors: Souki Kaku, Fukuoka (JP); Ryuichi Oguro, Fukuoka (JP); Hideki Honda, Fukuoka (JP)

(73) Assignee: Kabushiki Kaisha Yaskawa Denki, Fukoka (JP)

( * ) Notice: Subject to any disclaimer, the term of this patent is extended or adjusted under 35 U.S.C. 154(b) by 80 days.

(21) Appl. No.: 10/380,557

(22) PCT Filed: Sep. 25, 2001

(86) PCT No.: PCT/JP01/08280

§ 371 (c)(1),
(2), (4) Date: Mar. 12, 2003

(87) PCT Pub. No.: WO02/27911

PCT Pub. Date: Apr. 4, 2002

(65) Prior Publication Data

US 2003/0169004 A1 Sep. 11, 2003

(51) Int. Cl.⁷ .............................................. G05B 13/04
(52) U.S. Cl. .................. 318/568.22; 318/621; 318/632; 318/679
(58) Field of Search ............................ 318/568.22, 609, 318/610, 619–621, 632, 677–679

(56) References Cited

U.S. PATENT DOCUMENTS

| | | | |
|---|---|---|---|
| 3,893,011 A | * 7/1975 | Inaba et al. ................. | 318/685 |
| 5,086,648 A | * 2/1992 | Sano et al. ................. | 73/118.1 |
| 5,101,145 A | 3/1992 | Rehm | |
| 5,428,285 A | 6/1995 | Koyama et al. | |
| 5,550,953 A | * 8/1996 | Seraji ......................... | 700/263 |
| 5,652,491 A | 7/1997 | Ikawa et al. | |
| 6,662,073 B1 | * 12/2003 | Fujishima et al. .......... | 700/173 |

FOREIGN PATENT DOCUMENTS

| | | |
|---|---|---|
| JP | 6-30578 | 2/1994 |
| JP | 2000-92881 | 3/2000 |
| JP | 2000-92882 | 3/2000 |

* cited by examiner

Primary Examiner—Bentsu Ro
(74) Attorney, Agent, or Firm—Knobbe Martens Olson & Bear, LLP

(57) ABSTRACT

A motor controller, comprising a first simulation control unit (8) and a second simulation control unit (9) as a feed forward control means for inputting a command to an actual control unit (10) performing a feedback control, wherein the control parameter of the first simulation control unit (8) is set so that the high-speed property of a control response is increased, and the control parameter of the second simulation control unit (9) is set so that the stability of the control response is increased, whereby an entire feed forward control means can be designed so as to meet the requirements for the high-speed property and high stability of the control response.

40 Claims, 23 Drawing Sheets

MOTOR CONTROLLER

TECHNICAL FIELD

The present invention relates to a motor controller for an electric motor such as a direct-current motor, an induction motor, a synchronous motor, a linear motor or the like for driving a load mechanism such as a table or an arm of a robot in a machine tool.

BACKGROUND ART

As a controller for controlling a machine system comprised of a load mechanism such as a table or an arm of a robot in a machine tool, a driving device such as a direct-current motor, an induction motor, a synchronous motor, a linear motor or the like, and a transmission mechanism for connecting the load mechanism with the driving device, a controller having two degrees of freedom is often used, which has a feedback control unit which relies on a command value and an output value of a machine system to perform the control, and a feed forward control unit which relies only on the command value to perform the control. For example, Japanese Patent Application Laid Open No. 06-030578 discloses an exemplary controller having two degrees of freedom.

FIG. 1 is a block diagram illustrating the configuration of a conventional motor controller. The motor controller in FIG. 1 comprises feed forward signal processing circuit 25 and B control circuit 23 for performing a feedback control, and is a controller having two degrees of freedom for controlling machine system 6 which comprises load mechanism 1, transmission mechanism 2, electric motor 3, power converting circuit 4, and actual observing unit 5.

Power converting circuit 4 drives electric motor 3 in response to torque command T applied thereto, and a rotating force of electric motor 3 is transmitted to load mechanism 1 through transmission mechanism 2, thereby operating load mechanism 1. Actual observing unit 5 is rotation detector 4 for detecting a rotational speed ω and a rotation angle θ of electric motor 3.

Feed forward signal processing circuit 25 comprises two-inertia-system simulation circuit 24 in which a system is built through approximation and modeling of machine system 6, and A control circuit 22 which is intended to control this two-inertia-system simulation circuit 24. Two-inertia-system simulation circuit 24 receives torque signal $T_{Mr}$ applied from the A control circuit, and performs predetermined functional operations including at least two integrations to provide simulation rotation angle signal $\theta_{Mr}$ and simulation speed signal $\omega_{Mr}$. A control circuit 22 generates simulation torque signal $T_{Mr}$ applied to two-inertia-system simulation circuit 24 based on commanded rotation angle signal $\omega_{ref}$ provided from command generator 7 as well as simulation rotation angle signal $\theta_{Mr}$ and simulation speed signal $\omega_{Mr}$ provided from two-inertia-system simulation circuit 24.

B control circuit 23 comprises a position control circuit (not shown) and a speed control circuit (not shown). The position control circuit calculates and provides a speed command based on a deviation of simulation rotation angle signal $\theta_{Mr}$ from actual rotation angle signal θ detected by actual observing unit 5, while the speed control circuit calculates torque command T based on a deviation of the speed command provided from the position control circuit from actual speed signal ω, and provides torque command T to power converting circuit 4. B control circuit 23 can achieve high speed position control performance with the provision of the position control circuit and speed control circuit as mentioned.

Generally, in a motor controller as described above, the control response varies in high-speed property and stability depending on control parameters set in A control circuit 22, two-inertia-system simulation circuit 24 and the like. Generally, in such a motor controller, the parameters are relatively readily set for its control system when the high-speed property is solely required for the control response, or when the stability is solely required for the control response. Typically, however, such a motor controller is often required to provide both the high-speed property and high stability of the control response. In this event, the control parameters of A control circuit 22 and two-inertia-system simulation circuit 24 must be set to meet the requirements for both the high-speed property and high stability of the control response.

However, such a motor controller implies a problem in that adjustments of the control parameters to meet the requirements for both the high-speed property and high stability for the control response are very difficult and time-consuming work for an operator.

Particularly, in failure of establishment of conditions under which a machine system such as machine system 6 is regarded as an ideal rigid body, for example, when machine system 6 appears to include spring characteristics, two-inertia-system simulation circuit 24, which models machine system 6, is subjected to a fourth or higher order control, so that the motor control must find roots of a quartic equation in order to adjust control parameters of A control circuit 22 and two-inertia-system circuit 24 that meet the requirements for both the high-speed property and high stability of the control response, causing a problem in that the adjustments of these control parameters are made difficult and time-consuming.

As described above, in the motor controller, the control response varies in the high-speed property and stability depending on the control parameters set in control circuits. Generally, in such a motor controller, the control parameters are relatively readily set for its control system when the high-speed property is solely required for the control response, or when the stability is solely required for the control response. Typically, however, such a motor controller is often required to provide both the high-speed property and high stability of the control response. In this event, the control parameters of control circuits must be set to meet the requirements for both the high-speed property and high stability of the control response. However, the conventional motor controller implies a problem in that adjustments of the control parameters to meet the requirements for both the high-speed property and high stability of the control response are very difficult and time-consuming works for the operator.

DISCLOSURE OF THE INVENTION

It is an object of the present invention to provide a motor controller which is capable of readily realizing both of the high-speed property and high stability of a control response.

To achieve the above object, a motor controller according to the present invention includes two components: first simulation control means and second simulation control means as feed forward control means for applying a command to an actual control unit for performing a feedback control. By doing so, the overall feed forward control means can be designed to meet the requirements for the high-speed property and high stability of a control response by setting a control parameter of the first simulation control means to increase the high-speed property of the control response and setting a control parameter of the second simulation control means to increase the stability of the control response. While it is easy to set the control parameter of each simulation control means to meet the requirement for either the high-speed property or high stability of the control response, the motor controller according to the present invention can readily realize both the high-speed property and high stability of the control response.

BEST MODE FOR CARRYING OUT THE INVENTION

First Embodiment

Figure 1:
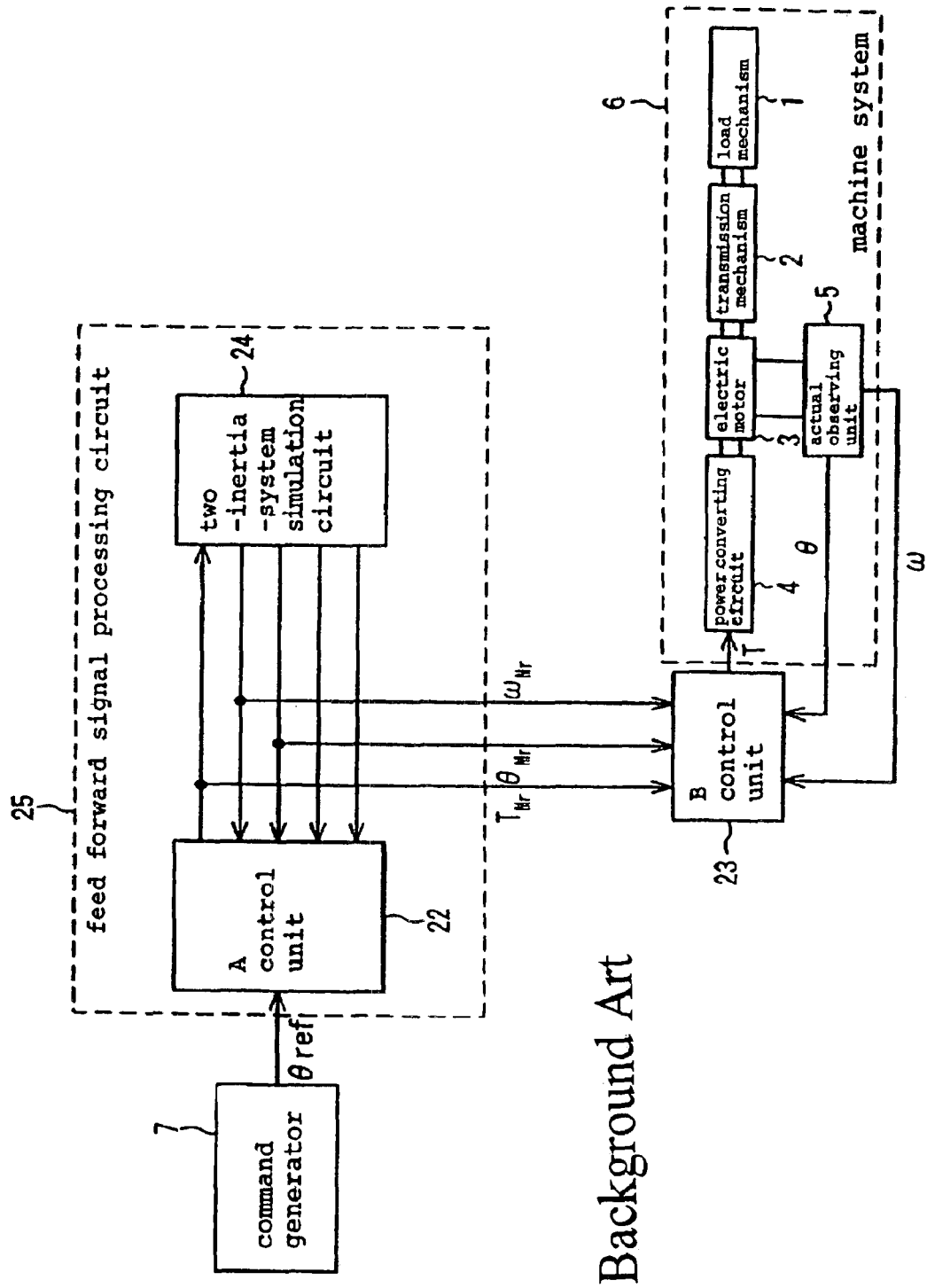
FIG. 1 is a block diagram illustrating the configuration of a conventional motor controller.
Figure 2:
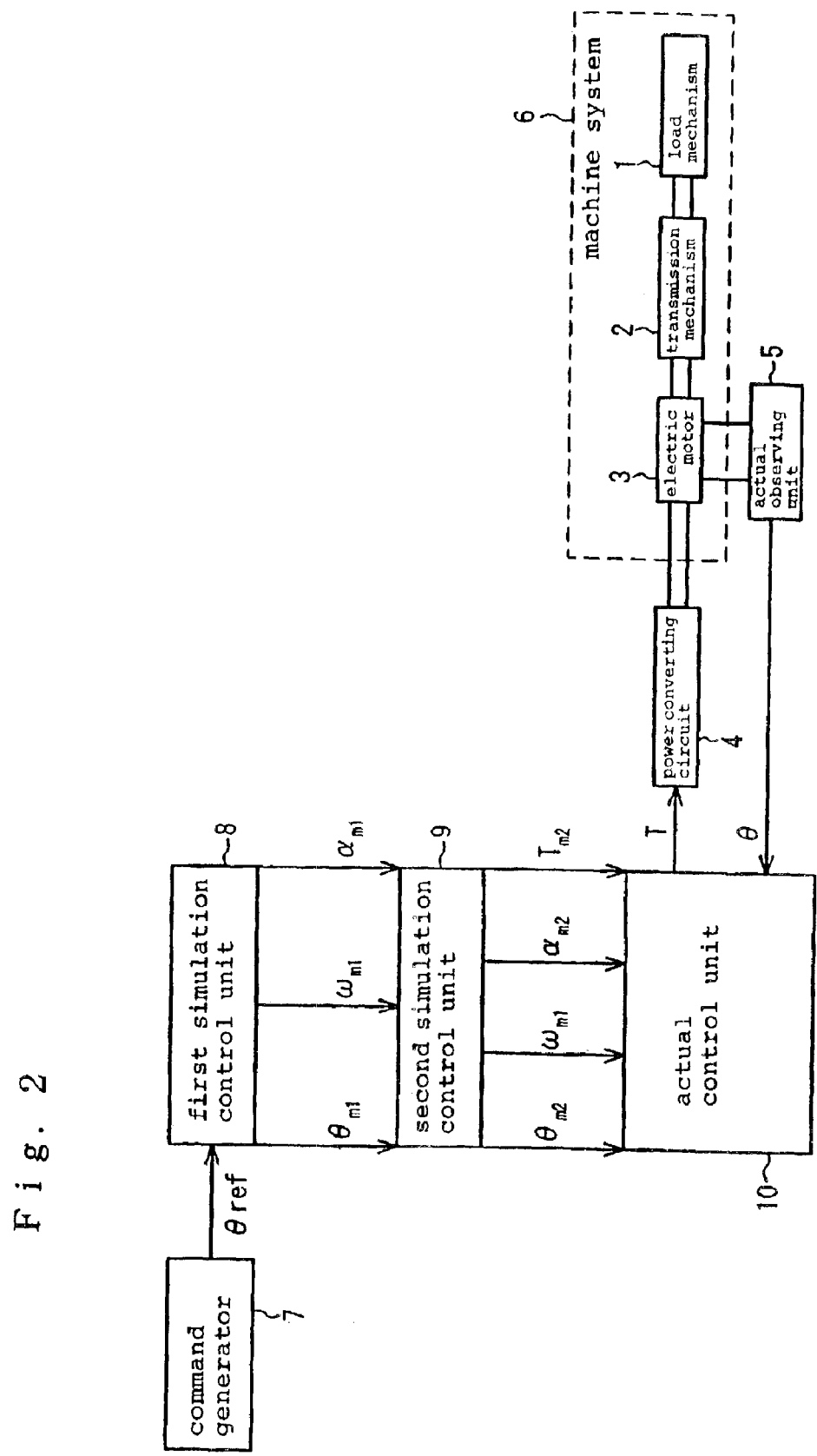
FIG. 2 is a block diagram illustrating the configuration of a motor controller according to a first embodiment of the present invention.

First, description will be made on a motor controller according to a first embodiment of the present invention. FIG. 2 is a block diagram illustrating the configuration of the motor controller according to this embodiment.

As illustrated in FIG. 2, the motor controller according to this embodiment is an apparatus for controlling the operation of machine system 6 based on commanded rotation angle signal $\theta_{ref}$ provided from command generator 7, and comprises first simulation control unit 8, second simulation control unit 9, and actual control unit 10.

First simulation control unit 8 receives commanded rotation angle signal $\theta_{ref}$ provided from command generator 7, calculates first simulation position signal $\theta_{m1}$, first simulation speed signal $\omega_{m1}$ and first simulation acceleration signal $\alpha_{m1}$ based on commanded rotation angle signal $\theta_{ref}$ and a first control parameter, and provides the calculated signals. First simulation control unit 9 calculates first simulation position signal $\theta_{m1}$, first simulation speed signal $\omega_{m1}$ and first simulation acceleration signal $\alpha_{m1}$ as expressed by the following equations (1)–(3):

$$\theta_{m1} = 1/(T_1 \times s+1)^2 \times \theta_{ref} \quad (1)$$

$$\omega_{m1} = s/(T_1 \times s+1)^2 \times \theta_{ref} \quad (2)$$

$$\alpha_{m1} = s^2/(T_1 \times s+1)^2 \times \theta_{ref} \quad (3)$$

where $T_1$ is a time constant which is the first control parameter, and s is a differential operator.

Second simulation control unit 9 calculates second simulation position signal $\theta_{m2}$, second simulation speed signal $\omega_{m2}$, second simulation acceleration signal a $\alpha_{m2}$, and simulation torque signal $T_{m2}$ based on first simulation position signal $\theta_{m1}$, first simulation speed signal $\omega_{m1}$, first simulation acceleration signal $\alpha_{m1}$, and a second control parameter, and provides the calculated signals.

Second simulation control unit 9 calculates second simulation position signal $\theta_{m2}$, second simulation speed signal $\omega_{m2}$, second simulation acceleration signal $\alpha_{m2}$, and simulation torque signal $T_{m2}$ as expressed by the following equations (4)–(6):

$$\theta_{m2} = \theta_{m1}/(T_2 \times s+1) \quad (4)$$

$$\omega_{m2} = \omega_{m1}/(T_2 \times s+1) \quad (5)$$

$$\alpha_{m2} = \alpha_{m1}/(T_2 \times s+1) \quad (6)$$

$$T_{m2} = \alpha_{m2} \times J \quad (7)$$

where $T_2$ is a time constant which is the second control parameter, s is a differential operator, and J is the inertia of machine system 6.

Actual control unit 10 receives second simulation position signal $\theta_{m2}$, second simulation speed signal $\omega_{m2}$, second simulation acceleration signal $\alpha_{m2}$ and simulation torque signal $T_{m2}$ for performing a feedback control to calculate and provide torque command T.

The motor controller according to this embodiment comprises a pair of first simulation control unit 8 and second simulation control unit 9 as feed forward control means which applies a command to actual control unit 10 for performing the feedback control. By doing so, the control parameter of first simulation control unit 8 is set to improve the high-speed property of the control response, while the control parameter of second simulation control unit 9 is set to increase the stability of the control response, thereby making it possible to allow the design of the overall feed forward control means to meet the requirements for the high-speed property and high stability of the control response. Since it is easy to set the control parameters of respective simulation control units 8, 9 to meet the requirement for either the high-speed property or high stability of the control response, the motor controller according to this embodiment can readily realize both the high-speed property and high responsibility of the control response.

In addition, the motor controller according to this embodiment can generate smooth second simulation position signal $\theta_{m2}$, second simulation speed signal $\omega_{m2}$ and second simulation acceleration signal $\alpha_{m2}$, which are applied to actual control unit 10, even if command generator 7 provides a discontinuous commanded rotation angle signal.

Second Embodiment

Next, description will be made on a motor controller according to a second embodiment of the present invention. This embodiment and third through fourteenth embodiments illustrate embodiments of first simulation control means in the motor controller according to the present invention, and in the motor controller according to this embodiment, those illustrated in fifteenth through twenty seventh embodiments are applied to second simulation control means, actual control means, and the like.

Figure 3:
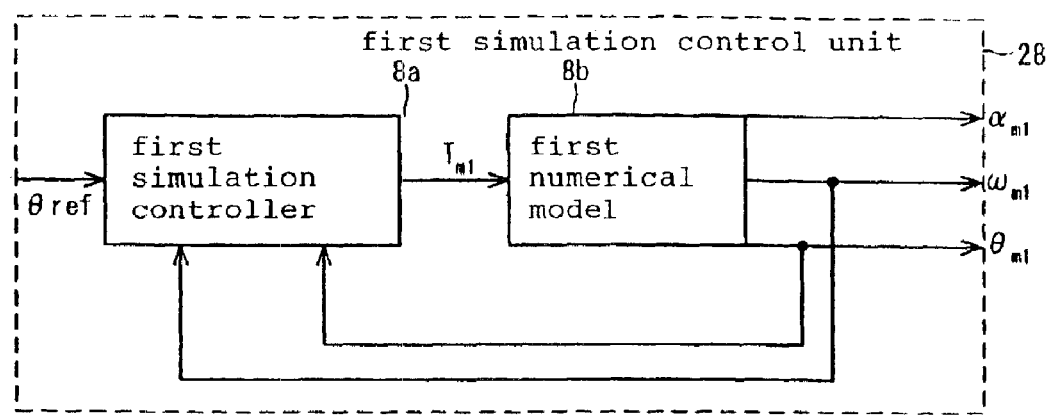
FIG. 3 is a block diagram illustrating the configuration of first simulation control unit 28 in a motor controller according to a second embodiment of the present invention.

The motor controller according to this embodiment differs from the motor controller in FIG. 2 in that first simulation control unit 28 is provided instead of first simulation control unit 8. FIG. 3 is a block diagram illustrating the configuration of first simulation control unit 28 in the motor controller according to this embodiment. As illustrated in FIG. 3, first simulation control unit 28 comprises first simulation controller 8a and first numerical model 8b.

First simulation controller 8a receives commanded rotation angle signal $\theta_{ref}$, first simulation position signal $\theta_{m1}$ and first simulation speed signal $\omega_{m1}$, and provides first simulation torque signal $T_{m1}$. First numerical model 8b receives first simulation torque signal $T_{m1}$ provided from first simulation controller 8a, and provides first simulation position signal $\theta_{m1}$, first simulation speed signal $\omega_{m1}$ and first simulation acceleration signal $\alpha_{m1}$.

First simulation controller 8a calculates first simulation torque signal $T_{m1}$ as expressed by the following equation (8):

$$T_{m1} = J_{m1} \times \{K_1 \times (\theta_{ref} - \theta_{m1}) - K_2 \times \omega_{m1}\} \quad (8)$$

where $J_{m1}$ represents the inertia of first numerical model 8b, and $K_1$, $K_2$ represent control gains.

First numerical model 8b in turn calculates first simulation acceleration signal $\alpha_{m1}$ by dividing inertia $J_{m1}$ by first simulation torque signal $T_{m1}$, first simulation speed signal $\omega_{m1}$ by integrating first simulation acceleration signal $\alpha_{m1}$, and first simulation position signal $\theta_{m1}$ by integrating first simulation speed signal $\omega_{m1}$. In other words, first simulation position signal $\theta_{m1}$, first simulation speed signal $\omega_{m1}$ and first simulation acceleration signal $\alpha_{m1}$ are calculated as expressed by the following equations (9)–(11):

$$\alpha_{m1} = T_{m1}/J_{m1} \quad (9)$$

$$\omega_{m1} = \alpha_{m1}/s \quad (10)$$

$$\theta_{m1} = \omega_{m1}/s \quad (11)$$

The motor controller according to this embodiment provides smooth first simulation acceleration signal $\alpha_{m1}$ by forming first simulation control unit 28 of first simulation controller 8a and first numerical model 8b, and simultaneously can speed up the response characteristic of first simulation position signal $\theta_{m1}$ to commanded rotation angle signal $\theta_{ref}$ because first simulation controller 8a performs the feedback control to reduce an error of first simulation position signal $\theta_{m1}$ with respect to commanded rotation angle signal $\theta_{ref}$.

Third Embodiment

Figure 4:
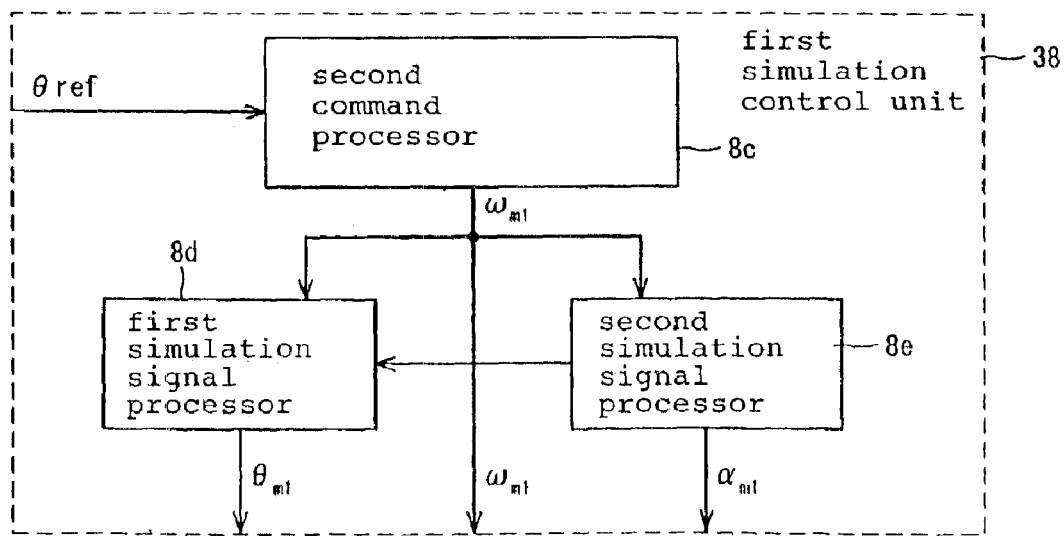
FIG. 4 is a block diagram illustrating the configuration of first simulation control unit 38 in a motor controller according to a third embodiment of the present invention.

Next, detailed description will be made on a motor controller according to a third embodiment of the present invention. The motor controller according to this embodiment differs from the motor controller of FIG. 2 in that first simulation control unit 38 is provided instead of first simulation control unit 8. FIG. 4 is a block diagram illustrating the configuration of first simulation control unit 38. As illustrated in FIG. 4, first simulation control unit 38 comprises first command processor 8c, first simulation signal processor 8d, and second simulation signal processor 8e.

First command processor 8c receives commanded rotation angle signal $\theta_{ref}$ and calculates first simulation speed signal $\omega_{m1}$ through the calculation of the aforementioned equation (2), and provides first simulation speed signal $\omega_{m1}$. First simulation signal processor 8d integrates the value of first simulation speed signal $\omega_{m1}$, and provides the integrated value signal as first simulation position signal $\theta_{m1}$. Second simulation signal processor 8e differentiates the value of first simulation speed signal $\omega_{m1}$, and provides the differentiated value signal as first simulation acceleration signal $\alpha_{m1}$.

The motor controller according to this embodiment can calculate first simulation position signal $\theta_{m1}$, first simulation speed signal $\omega_{m1}$ and first simulation acceleration signal $\alpha_{m1}$ with a less amount of processing, as compared with the motor controller according to the second embodiment.

Fourth Embodiment

Next, detailed description will be made on a motor controller according to a fourth embodiment of the present invention. The motor controller according to this embodiment differs from the motor controller of FIG. 2 in that first simulation control unit 48 is provided instead of first simulation control unit 8.

Figure 5:
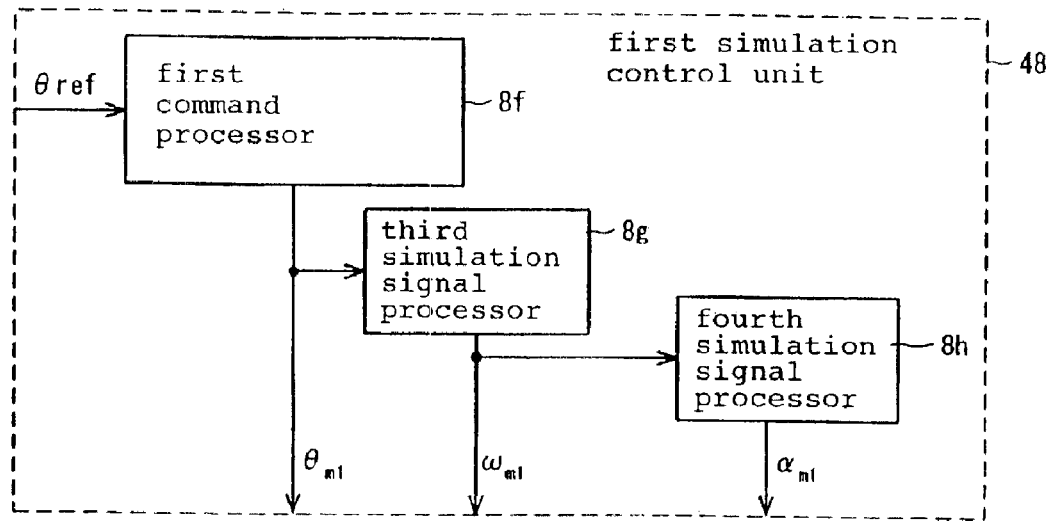
FIG. 5 is a block diagram illustrating the configuration of first simulation control unit 48 in a motor controller according to a fourth embodiment of the present invention.

FIG. 5 is a block diagram illustrating the configuration of first simulation control unit 48. As illustrated in FIG. 5, first simulation control unit 48 comprises second command processor 8f, third simulation signal processor 8g, and fourth simulation signal processor 8h.

Second command processor 8f receives commanded rotation angle signal $\theta_{ref}$, calculates first simulation position signal $\theta_{m1}$ through the aforementioned equation (1), and provides the calculated signal. Third simulation signal processor 8g differentiates first simulation position signal $\theta_{m1}$ to provide first simulation speed signal $\omega_{m1}$. Fourth simulation signal processor 8h differentiates first simulation speed signal $\omega_{m1}$ to provide first simulation acceleration signal $\alpha_{m1}$.

The motor controller according to this embodiment can generate first simulation position signal $\theta_{m1}$, first simulation speed signal $\omega_{m1}$ and first simulation acceleration signal $\alpha_{m1}$ with a less amount of processing, as compared with the motor controller according to the second embodiment, and can reduce the error of first simulation position signal $\theta_{m1}$ with respect to commanded rotation angle signal $\theta_{ref}$ in a steady state from the motor controller according to the second embodiment because first simulation control unit 48 does not include a feedback element.

Fifth Embodiment

Figure 6:
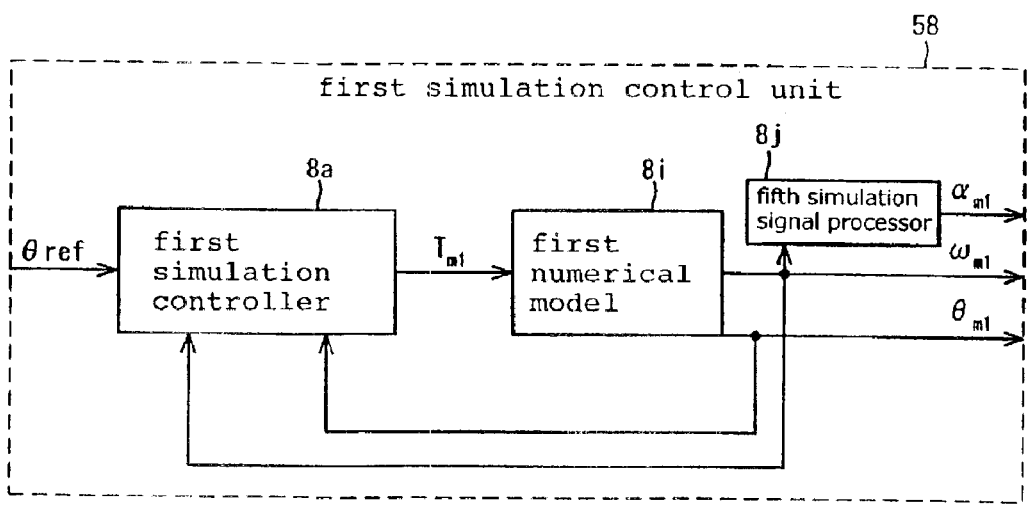
FIG. 6 is a block diagram illustrating the configuration of first simulation control unit 58 in a motor controller according to a fifth embodiment of the present invention.

FIG. 6 is a block diagram illustrating first simulation control unit 58 in a motor controller according to this embodiment. The motor controller according to this embodiment differs from the motor controller of FIG. 2 in that first simulation control unit 58 is provided instead of first simulation control unit 8.

As illustrated in FIG. 6, first simulation control unit 58 comprises first numerical model 8i and fifth simulation signal processor 8j in addition to first simulation controller 8a in first simulation control unit 28 of FIG. 3.

First numerical model 8i receives first simulation torque signal $T_{m1}$, divides first simulation torque signal $T_{m1}$ by inertia $J_{m1}$, integrates the result, as shown in the following equation (12), which is provided as first simulation speed signal $\omega_{m1}$, and integrates first simulation speed signal $\omega_{m1}$ as shown in the following equation (13) and provides the integrated signal as first simulation position signal $\theta_{m1}$.

$$\omega_{m1} = T_{m1}/(s \times J_{m1}) \quad (12)$$

$$\theta_{m1} = \omega_{m1}/s \quad (13)$$

Fifth simulation signal processor 8j differentiates an output value of a first-order filter, which receives first simulation speed signal $\omega_{m1}$, as shown in the following equation (14), and provides the differentiated value as first simulation acceleration signal $\alpha_{m1}$.

$$\alpha_{m1} = s \times \omega_{m1}/(T_3 \times s + 1) \quad (14)$$

where $T_3$ is the time constant of the first-order filter.

The motor controller according to the present invention can adjust the amplitude and phase of first simulation acceleration signal $\alpha_{m1}$ with the provision of fifth simulation signal processor 8j.

Sixth Embodiment

Next, detailed description will be made on a motor controller according to a sixth embodiment of the present invention. While the motor controller according to this embodiment is substantially similar to first simulation control unit 28 of FIG. 3 and first simulation control unit 58 of FIG. 6 in the configuration of the first simulation control unit, it differs from first simulation control units 28, 58 in that first simulation controller 68a is provided instead of first simulation controller 8a.

Figure 7:
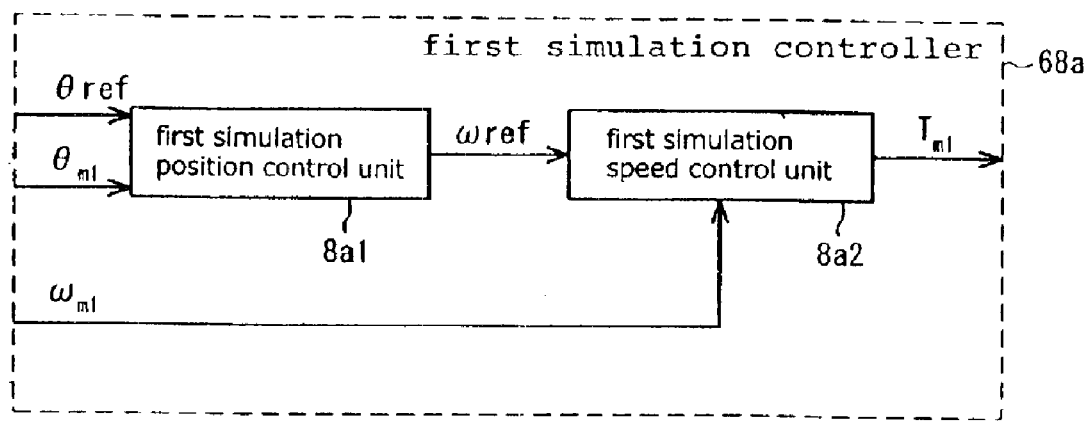
FIG. 7 is a block diagram illustrating the configuration of first simulation controller 68a in a motor controller according to a sixth embodiment of the present invention.

FIG. 7 is a block diagram illustrating the configuration of first simulation controller 68a in the motor controller according to this embodiment. As illustrated in FIG. 7, first simulation controller 68a comprises first simulation position control unit 8a1 and first simulation speed control unit 8a2.

First simulation position control unit 8a1 receives commanded rotation angle signal $\theta_{ref}$ and first simulation position signal $\theta_{m1}$, and solves the following equation (15) to calculate and provide first simulation speed command signal $\omega_{ref}$:

$$\omega_{ref} = K_{P1} \times (\theta_{ref} - \theta_{m1}) \quad (15)$$

where $K_{P1}$ is a position proportional control gain.

First simulation speed control unit 8a2 receives first simulation speed command signal $\omega_{ref}$ and first simulation speed signal $\omega_{m1}$, and solves the following equation (16) to calculate and output first simulation torque signal $T_{m1}$:

$$T_{m1} = K_{V1} \times (\omega_{ref} - \omega_{m1}) \quad (16)$$

where $K_{V1}$ is a speed proportional control gain.

With the first simulation controller comprised of the first simulation position control unit and first simulation speed control unit, the motor controller according to this embodiment can achieve similar response characteristics to the motor controllers according to the second and fifth embodiments even if the first simulation position control unit has a gain smaller than control gains $K_1$, $K_2$ of the second and fifth motor controllers.

Seventh Embodiment

Next, detailed description will be made on a motor controller according to a seventh embodiment of the present invention.

The motor controller according to this embodiment differs from the motor controller according to the sixth embodiment in that first simulation controller 78a is provided instead of first simulation controller 68a.

Figure 8:
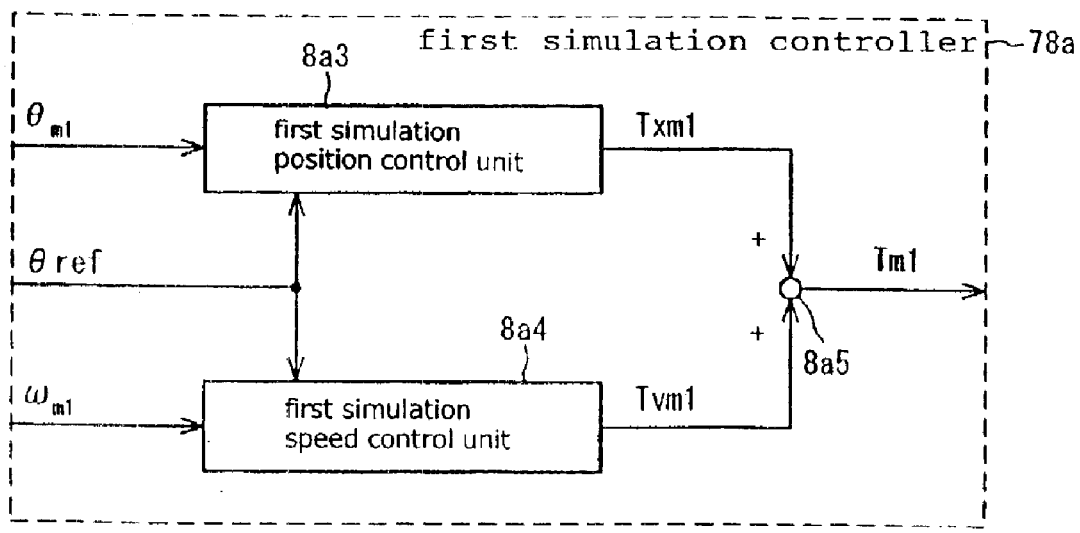
FIG. 8 is a block diagram illustrating the configuration of first simulation controller 78a in a motor controller according to a seventh embodiment of the present invention.

FIG. 8 is a block diagram illustrating first simulation controller 78a. As illustrated in FIG. 8, first simulation controller 78a comprises first simulation position control unit 8a3, first simulation speed control unit 8a4, and adder 8a5.

First simulation position control unit 8a3 receives commanded rotation angle signal $\theta_{ref}$ and first simulation position signal $\theta_{m1}$, and solves the following equation (17) to provide first simulation torque command signal $Tx_{m1}$:

$$Tx_{m1} = K_{P1} \times (\theta_{ref} - \theta_{m1}) \quad (17)$$

where $K_{P1}$ is a position proportional control gain.

First simulation speed control unit 8a4 receives commanded rotation angle signal $\theta_{ref}$ and first simulation speed signal $\omega_{m1}$, and solves the following equation (18) to provide second simulation torque command signal $Tv_{m1}$:

$$Tv_{m1} = K_{V1} \times (\theta_{ref}/s - \omega_{m1}) \quad (18)$$

where $K_{V1}$ is a speed proportional control gain.

Adder 8a5 adds first simulation torque command signal $Tx_{m1}$ and second simulation torque command signal $Tv_{m1}$, and provides the sum signal as first simulation torque signal $T_{m1}$.

The motor controller according to this embodiment can switch a position control mode and a speed control mode because first simulation position control unit 8a3, which is a position controller, is arranged in parallel with first simulation speed control unit 8a4 which is a speed controller.

Eighth Embodiment

Next, detailed description will be made on a motor controller according to an eighth embodiment of the present invention. The motor controller according to this embodiment is substantially similar in the configuration to the motor controllers according to the sixth and seventh embodiments, and differs from the sixth and seventh embodiments in that first simulation controllers 88a, 98a illustrated in FIGS. 9(a) and 9(b) are provided instead of first simulation controllers 68a, 78a in FIGS. 7 and 8.

FIG. 9(a) is a block diagram illustrating the configuration of first simulation controller 88a, and FIG. 9(b) is a block diagram illustrating the configuration of first simulation controller 98a.

As illustrated in FIGS. 9(a) and 9(b), first simulation controllers 88a, 98a differ from first simulation controllers 68a, 78a in FIGS. 7 and 8 in that first simulation limiter 8a6 and first simulation limiter 8a7 are provided, respectively.

First simulation limiter 8a6 and first simulation limiter 8a7 limit the value of first simulation torque signal $T_{m1}$ such that first simulation torque signal $T_{m1}$ falls within a predetermined torque range of electric motor 3. With the addition of such simulation limiters 8a6, 8a7, the motor controller according to this embodiment can previously generate first simulation torque signal $T_{m1}$ in consideration of a maximum driving torque of the electric motor.

Ninth Embodiment

Next, detailed description will be made on a motor controller according to a ninth embodiment of the present invention.

Figure 9:
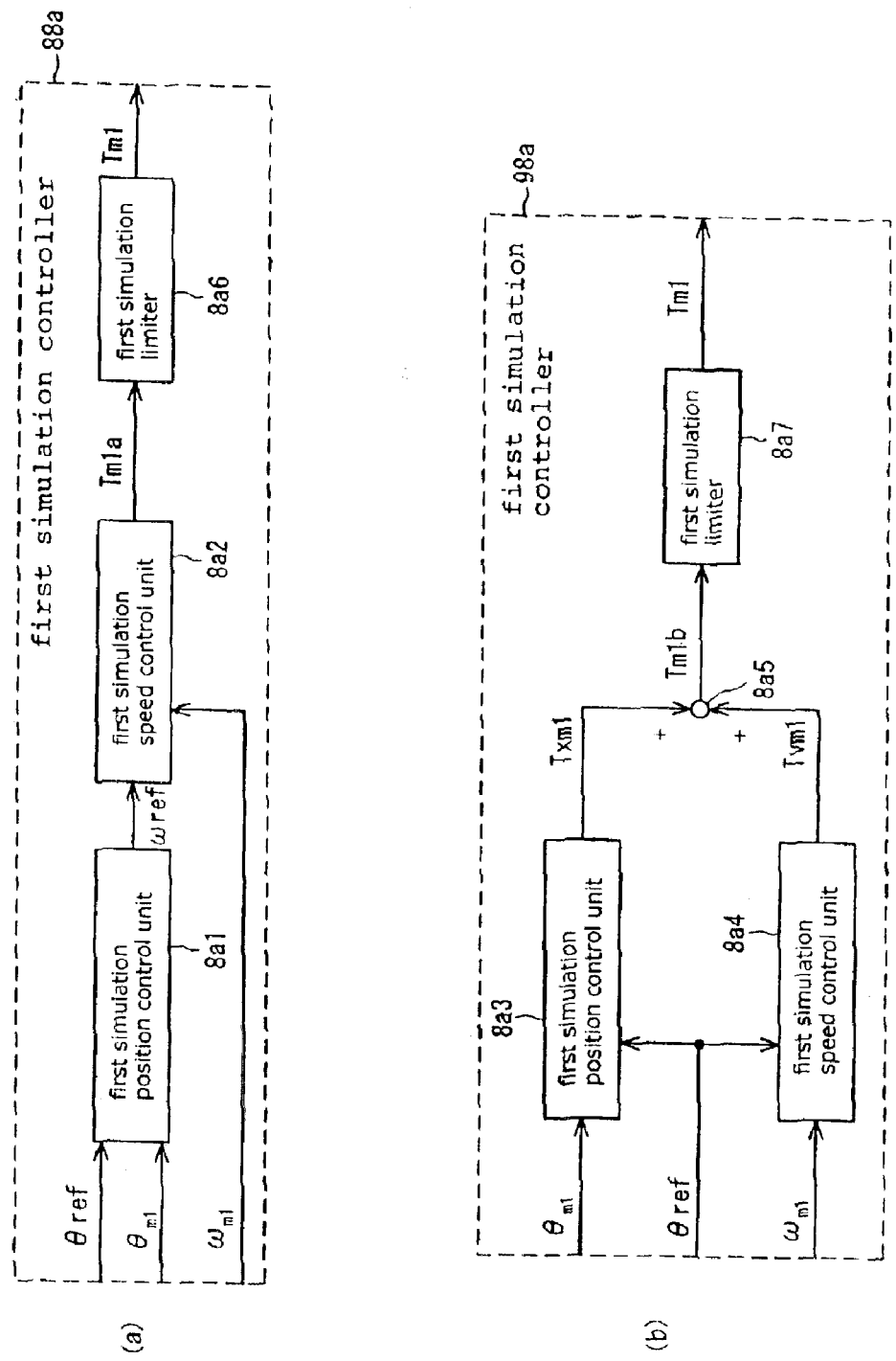
FIG. 9 is a block diagram illustrating the configuration of first simulation controllers 88a, 98a in a motor controller according to an eighth embodiment of the present invention.

The motor controller according to this embodiment comprises first simulation position control unit 8a12 instead of first simulation position control unit 8a1 of first simulation controllers 68a, 88a in FIGS. 7 and 9.

Figure 10:
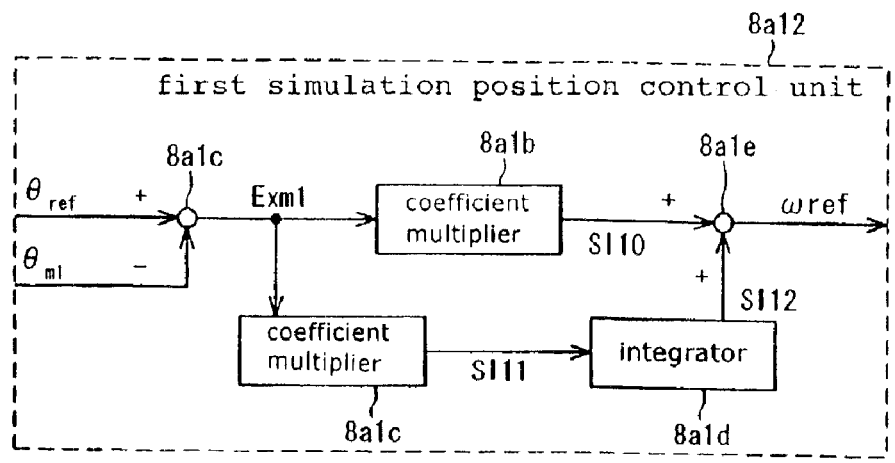
FIG. 10 is a block diagram illustrating the configuration of first simulation position control unit 8a12 in a motor controller according to a ninth embodiment of the present invention.

FIG. 10 is a block diagram illustrating the configuration of first simulation position control unit 8a12. As illustrated in FIG. 10, first simulation position control unit 8a12 comprises subtractor 8a1a, coefficient multiplier 8a1b, coefficient multiplier 8a1c, integrator 8a1d, and adder 8a1e.

Subtractor 8a1a subtracts first simulation position signal $\theta_{m1}$ from commanded rotation angle signal $\theta_{ref}$ to provide first simulation position error signal $Ex_{m1}$.

Coefficient multiplier 8a1b multiplies first simulation position error signal $Ex_{m1}$ by $K_{P1}$, and provides the product signal as tenth simulation signal SI10. Coefficient multiplier 8a1c multiplies first simulation position error signal $Ex_{m1}$ by $K_{I1}$, and provides the product signal as eleventh simulation signal SI11. Integrator 8a1d integrates the eleventh simulation signal, and provides the integrated value as twelfth simulation signal SI12.

Adder 8a1e adds tenth simulation signal SI10 and twelfth simulation signal SI12, and provides the sum signal as first simulation speed command signal $\omega_{ref}$.

Since integrator 8a1d is added to first simulation position control unit 8a12 to perform a proportional and integral control, the motor controller according to this embodiment can eliminate an error between first simulation position signal $\theta_{m1}$ and commanded rotation angle signal $\theta_{ref}$ even if a processing error exists.

Tenth Embodiment

Next, a motor controller according to a tenth embodiment of the present invention will be described in detail with reference to FIG. 11. The motor controller according to this embodiment comprises first simulation speed control unit 8a22 instead of first simulation speed control unit 8a1 in first simulation controllers 68a, 88a of FIGS. 7 and 9.

Figure 11:
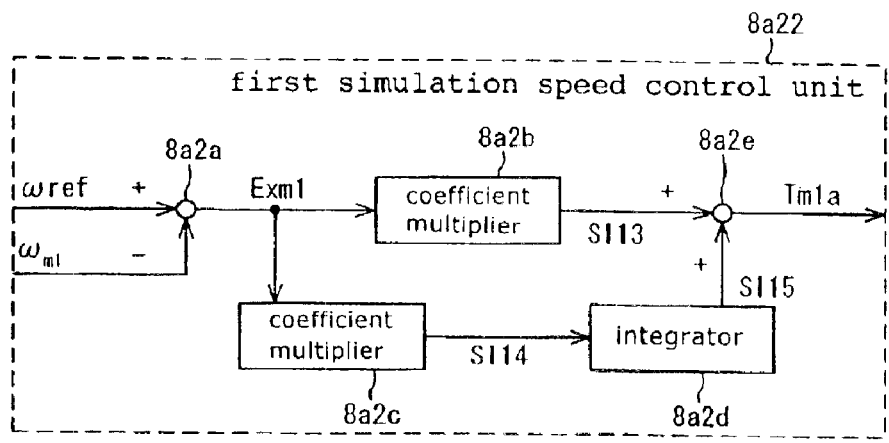
FIG. 11 is a block diagram illustrating the configuration of first simulation speed control unit 8a22 in a motor controller according to a tenth embodiment of the present invention.

FIG. 11 is a block diagram illustrating the configuration of first simulation speed control unit 8a22. As illustrated in FIG. 11, first simulation speed control unit 8a22 comprises subtractor 8a2a, coefficient multiplier 8a2b, coefficient multiplier 8a2c, integrator 8a2d, and adder 8a2e.

Subtractor 8a2a subtracts first simulation speed signal $\omega_{m1}$ from first simulation speed command signal $\omega_{ref}$, and provides the difference value as first simulation position error signal $Ev_{m1}$.

Coefficient multiplier 8a2b multiplies first simulation speed error signal $Ev_{m1}$ by $K_{V1}$, and provides the product value as thirteenth simulation signal SI13, while coefficient multiplier 8a2c multiplies first simulation speed error signal $Ev_{m1}$ by $K_{I1}$, and provides the product value as fourteenth simulation signal SI14.

Integrator 8a2d integrates fourteenth simulation signal SI14, and provides the integrated value as fifteenth simulation signal SI15.

Adder 8a2e adds thirteenth simulation signal SI13 and fifteenth simulation signal SI15, and provides the sum signal as first simulation torque command signal $T_{m1a}$.

With the addition of integrator 8a2d to first simulation speed control unit 8a22, a proportional and integral control is performed even when a position control mode is switched to a speed control mode and vice versa, so that the motor controller according to this embodiment can eliminate an error between first simulation position signal $\theta_{m1}$ and commanded rotation angle signal $\theta_{ref}$ in a steady state.

Eleventh Embodiment

Next, detailed description will be made on a motor controller according to an eleventh embodiment of the present invention. The motor controller according to this embodiment comprises first simulation speed control unit 8a32 instead of first simulation speed control unit 8a3 of first simulation controllers 78a, 98a in FIGS. 8 and 9.

Figure 12:
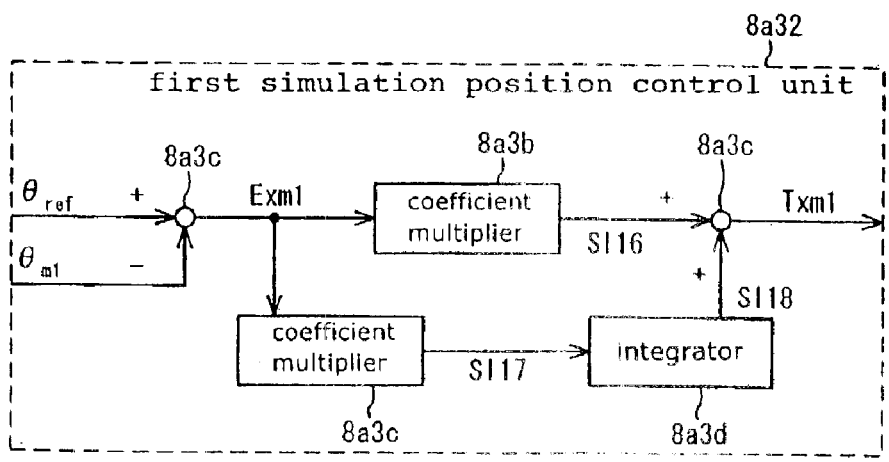
FIG. 12 is a block diagram illustrating the configuration of first simulation position control unit 8a32 in a motor controller according to an eleventh embodiment of the present invention.

FIG. 12 is a block diagram illustrating the configuration of first simulation position control unit 8a32. As illustrated in FIG. 12, first simulation position control unit 8a32 comprises subtractor 8a3a, coefficient multiplier 8a3b, coefficient multiplier 8a3c, integrator 8a3d, and adder 8a3e.

Subtractor 8a3a subtracts first simulation position signal $\theta_{m1}$ from commanded rotation angle signal $\theta_{ref}$, and provides the difference value as first simulation position error signal $Ex_{m1}$. Coefficient multiplier 8a3b multiplies first simulation position error signal $Ex_{m1}$ by $K_{P1}$, and provides the product signal as sixteenth simulation signal SI16. Coefficient multiplier 8a3c multiplies first simulation position error signal $Ex_{m1}$ by $K_{I1}$, and provides the product signal as seventeenth simulation signal SI17. Integrator 8a3d integrates seventeenth simulation signal SI17, and provides the integrated signal as eighteenth simulation signal SI18.

Adder 8a3e adds sixteenth simulation signal SI16 and eighteenth simulation signal SI18, and provides the sum signal as first simulation torque command signal $Tx_{m1}$.

Since integrator 8a3d is added to first simulation position control unit 8a32 to perform a proportional and integral control, the motor controller according to this embodiment can eliminate an error between first simulation position signal $\theta_{m1}$ and commanded rotation angle signal $\theta_{ref}$ even if a calculation error exists.

Twelfth Embodiment

Next, detailed description will be made on a motor controller according to a twelfth embodiment of the present invention. The motor controller according to this embodiment comprises first simulation speed control unit 8a42 instead of first simulation speed control unit 8a4 of first simulation controllers 78a, 98a in FIGS. 8 and 9.

Figure 13:
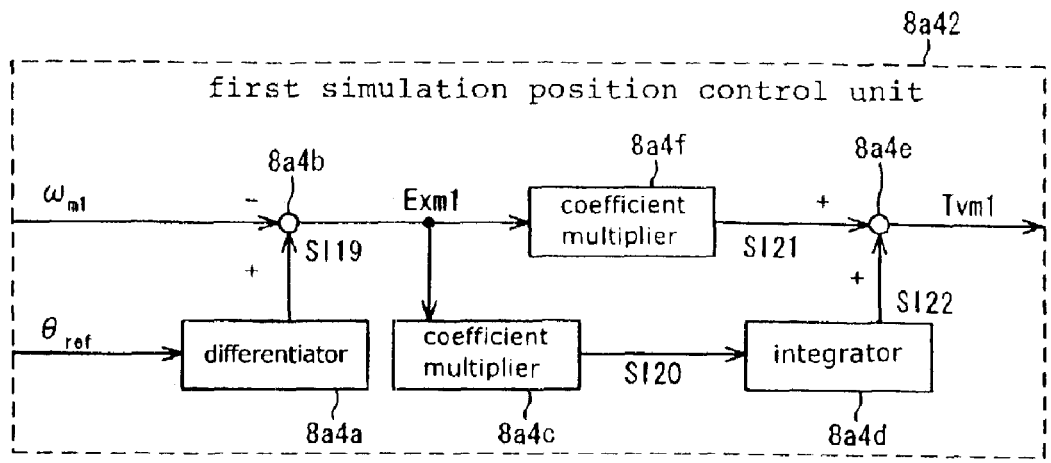
FIG. 13 is a block diagram illustrating the configuration of first simulation speed control unit 8a4 in a motor controller according to a twelfth embodiment of the present invention.

FIG. 13 is a block diagram illustrating the configuration of first simulation speed control unit 8a42. As illustrated in FIG. 13, first simulation speed control unit 8a42 comprises differentiator 8a4a, subtractor 8a4b, coefficient multiplier 8a4c, coefficient multiplier 8a4f, integrator 8a4d, and adder 8a4e.

Differentiator 8a4a differentiates commanded rotation angle signal $\theta_{ref}$ to provide nineteenth simulation signal SI19. Subtractor 8a4b subtracts nineteenth simulation signal SI19 from first simulation speed signal $\omega_{m1}$ to provide first simulation speed error signal $Ev_{m1}$. Coefficient multiplier 8a4c multiplies first simulation speed error signal $Ev_{m1}$ by $K_{I1}$, and provides the product signal as twentieth simulation signal SI20. Coefficient multiplier 8a4f multiplies the value of first simulation speed error signal $Ev_{m1}$ by $K_{v1}$, and provides the product signal as twenty first simulation signal SI21. Integrator 8a4d integrates twentieth simulation signal SI20 to provide twenty second simulation signal SI22. Adder 8a4e adds twenty first simulation signal SI21 and twenty second simulation signal SI22 to provide second simulation torque command signal $Tv_{m1}$.

Since first simulation speed control unit 8a42 comprises integrator 8a4d to perform a proportional and integral control, the motor controller according to this embodiment can eliminate an error between first simulation position signal $\theta_{m1}$ and commanded rotation angle signal $\theta_{ref}$ in a steady state even if the position control mode is switched to the speed control mode and vice versa.

Thirteenth Embodiment

Next, detailed description will be made on a motor controller according to a thirteenth embodiment of the present invention.

The motor controller according to this embodiment comprises first numerical model 138b instead of first model 8b in first simulation control unit 28 of FIG. 3.

Figure 14:
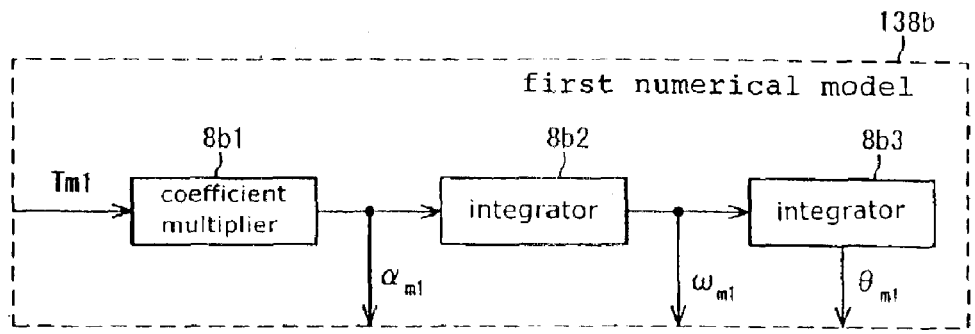
FIG. 14 is a block diagram illustrating a first numerical model 138b in a motor controller according to a thirteenth embodiment of the present invention.

FIG. 14 is a block diagram illustrating the configuration of first numerical model 138b. As illustrated in FIG. 14, first numerical model 138b comprises coefficient multiplier 8b1, integrator 8b2, and integrator 8b3.

Coefficient multiplier 8b1 receives first simulation torque signal $T_{m1}$, calculates first simulation acceleration signal $\alpha_{m1}$ as expressed by the following equation (19), and provides first simulation acceleration signal $\alpha_{m1}$. Integrator 8b2 integrates first simulation acceleration signal $\alpha_{m1}$ as expressed by the following equation (20), and provides the integrated signal as first simulation speed signal $\omega_{m1}$. Integrator 8b3 integrates first simulation speed signal $\omega_{m1}$ as expressed by the following equation (21), and provides the integrated value as first simulation position signal $\theta_{m1}$.

$$\alpha_{m1} = T_{m1}/J \qquad (19)$$

$$\omega_{m1} = \alpha_{m1}/s \qquad (20)$$

$$\theta_{m1} = \theta_{m1}/s \qquad (21)$$

Like the motor controller according to the second embodiment, by fixing first numerical model 138b to a rigid body model, the motor controller according to this embodiment can readily set control parameters such as control gains $K_1$, $K_2$, and the like of first simulation controllers 8a, 68a, 78a, 88a, 98a in accordance with required response characteristics.

Fourteenth Embodiment

Next, detailed description will be made on a motor controller according to a fourteenth embodiment of the present invention.

The motor controller according to this embodiment comprises first numerical model 148i instead of first numerical model 8i in first simulation control unit 58 of FIG. 6.

Figure 15:
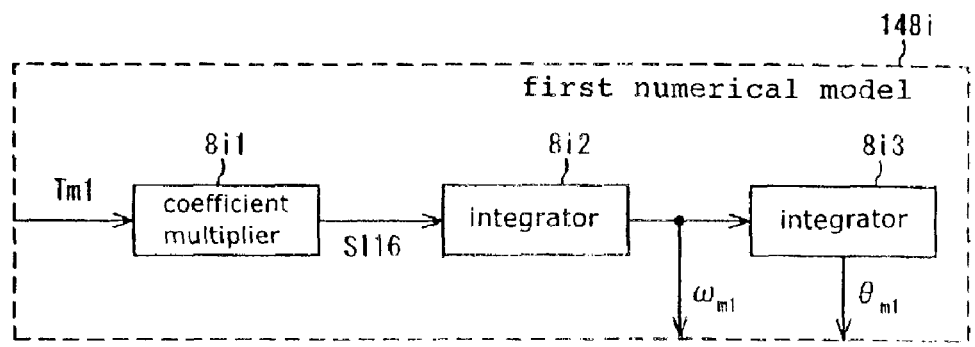
FIG. 15 is a block diagram illustrating a first numerical model 148i in a motor controller according to a fourteenth embodiment of the present invention.

FIG. 15 is a block diagram illustrating the configuration of first numerical model 148i. As illustrated in FIG. 15, first numerical model 8i comprises coefficient multiplier 8i1, integrator 8i2, and integrator 8i3.

Coefficient multiplier 8i1 receives first simulation torque signal $T_{m1}$, and provides sixteenth simulation signal SI16 as expressed by the aforementioned equation (19). Integrator 8i2 integrates sixteenth simulation signal SI16 to provide first simulation speed signal $\omega_{m1}$. Integrator 8i3 integrates first simulation speed signal $\omega_{m1}$ to provide first simulation position signal $\theta_{m1}$.

By fixing first numerical model 148i to a rigid body model in a manner similar to first numerical model 8i, the motor controller according to this embodiment can readily set control parameters such as control gains $K_1$, $K_2$, and the like of the first simulation controllers in accordance with required response characteristics.

Fifteenth Embodiment

Next, detailed description will be made on a motor controller according to a fifteenth embodiment of the present invention. This embodiment and sixteenth through twenty fourth embodiments illustrate embodiments of second simulation control means in the motor controller according to the present invention, and in the motor controller according to this embodiment, those illustrated in the first through fourteenth and twenty fifth through twenty seventh embodiments are applied to the first simulation control means, actual control means, and the like.

Figure 16:
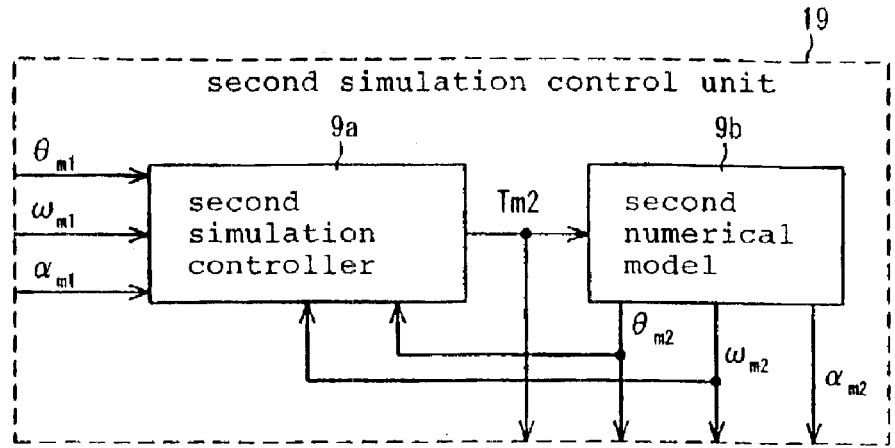
FIG. 16 is a block diagram illustrating the configuration of second simulation control unit 19 in a motor controller according to a fifteenth embodiment of the present invention.

FIG. 16 is a block diagram illustrating the configuration of second simulation control unit 19. As illustrated in FIG. 16, second simulation control unit 19 comprises second simulation controller 9a and second numerical model 9b.

Second simulation controller 9a receives first simulation position signal $\theta_{m1}$, first simulation speed signal $\omega_{m1}$, first simulation acceleration signal $\alpha_{m1}$, second simulation position signal $\theta_{m2}$, and second simulation speed signal $\omega_{m2}$, calculates second simulation torque signal $T_{m2}$ in accordance with the following equation (22), and provides the calculated signal:

$$T_{m2}=J_{m2} \times \alpha_{m1} \times J_{m3} \times \{K_3(\theta_{m1}-\theta_{m2})-K_4(\omega_{m1}-\omega_{m2})\} \quad (22)$$

where $J_{m2}$, $J_{m3}$ represent the inertia of the second numerical model, and $K_3$, $K_4$ represent control gains.

Second numerical model 9b receives second simulation torque signal $T_{m2}$, calculates second simulation position signal $\theta_{m2}$, second simulation speed signal $\omega_{m2}$, and second simulation acceleration signal $\alpha_{m2}$ in accordance with following equations (23)–(25), and provides the calculated signals:

$$\alpha_{m2}=T_{m2}/J_{m3} \quad (23)$$

$$\omega_{m2}=T_{m2}/(s \times J_{m3}) \quad (24)$$

$$\theta_{m2}=T_{m2}/(s^2 \times J_{m3}) \quad (25)$$

Since second simulation controller 9a performs the control using first simulation acceleration signal $\alpha_{m1}$, first simulation position signal $\theta_{m1}$, first simulation speed signal $\omega_{m1}$, second simulation position signal $\theta_{m2}$ and second simulation speed signal $\omega_{m2}$, the motor controller according to this embodiment can bring the response characteristics of second simulation position signal $\theta_{m2}$ and second simulation speed signal $\omega_{m2}$ close to the response characteristics of first simulation position signal $\theta_{m1}$ and first simulation speed signal $\omega_{m1}$ without increasing the values of gains $K_3$, $K_4$ to such an extent that the motor controller would lose the stability in the control.

Also, the motor controller according to this embodiment can provide smoother response characteristics of second simulation position signal $\theta_{m2}$, second simulation speed signal $\omega_{m2}$ and second simulation acceleration signal $\alpha_{m2}$, as compared with the response characteristics of first simulation acceleration signal $\alpha_{m1}$, first simulation position signal $\theta_{m1}$ and first simulation speed signal $\omega_{m1}$.

Further, when machine system 6 is a rigid body system, the motor controller according to this embodiment can operate machine system 6 in accordance with commanded rotation angle signal $\theta_{ref}$ by building second numerical model 9b with a rigid body model.

As described above, the motor controller according to this embodiment can readily provide appropriate second simulation position signal $\theta_{m2}$, second simulation speed signal $\omega_{m2}$, second simulation acceleration signal $\alpha_{m2}$, and simulation torque signal T in accordance with the speed and smoothness of required response characteristics by forming second simulation control unit 19 of second simulation controller 9a and second numerical model 9b.

Sixteenth Embodiment

Next, detailed description will be made on a motor controller according to a sixteenth embodiment of the present invention.

The motor controller according to this embodiment differs from the motor controller according to the fifteenth embodiment in that second simulation control unit 29 is provided instead of second simulation control unit 19 of FIG. 16.

Figure 17:
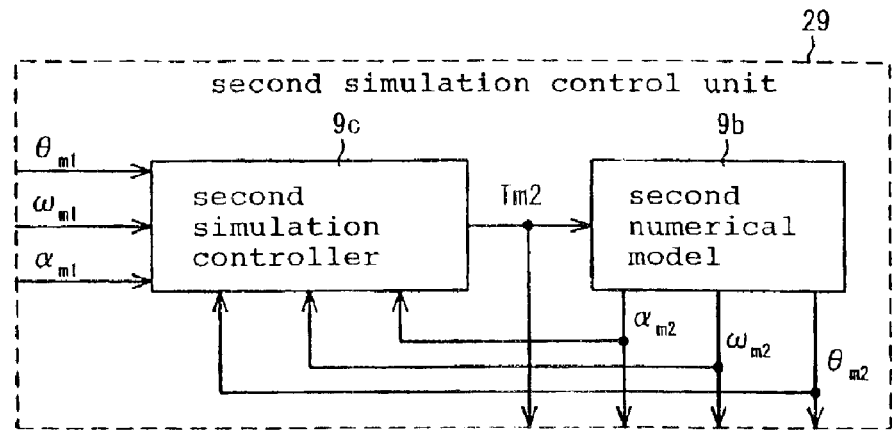
FIG. 17 is a block diagram illustrating the configuration of second simulation control unit 29 in a motor controller according to a sixteenth embodiment of the present invention.

FIG. 17 is a block diagram illustrating the configuration of second simulation control unit 29. As illustrated in FIG. 17, second simulation control unit 29 differs from second simulation control unit 19 in that second simulation controller 9c is provided instead of second simulation controller 9a.

Second simulation controller 9c receives first simulation position signal $\theta_{m1}$, first simulation speed signal $\omega_{m1}$, first simulation acceleration signal $\alpha_{m1}$, second simulation position signal $\theta_{m2}$, second simulation speed signal $\omega_{m2}$, and second simulation acceleration signal $\alpha_{m2}$, and calculates second simulation torque signal $T_{m2}$ in accordance with following equation (26), and provides the calculated signal:

$$T_{m2}=J_{m2} \times \alpha_{m1}-J_{m4} \times \alpha_{m2}+J_{m3} \times \{K_3(\theta_{m1}-\theta_{m2})-K_4(\omega_{m1}-\omega_{m2})\} \quad (26)$$

The motor controller according to this embodiment can reduce the amount of overshoot of second simulation speed signal $\omega_{m2}$, as compared with second simulation controller 9a of FIG. 16, by feeding second simulation acceleration signal $\alpha_{m2}$ back to second simulation controller 9c.

Seventeenth Embodiment

Next, detailed description will be made on a motor controller according to a seventeenth embodiment of the present invention.

The motor controller according to this embodiment employs second numerical model 179b which is another embodiment of second numerical model 9b in the motor controllers according to the fifteenth and sixteenth embodiments.

Figure 18:
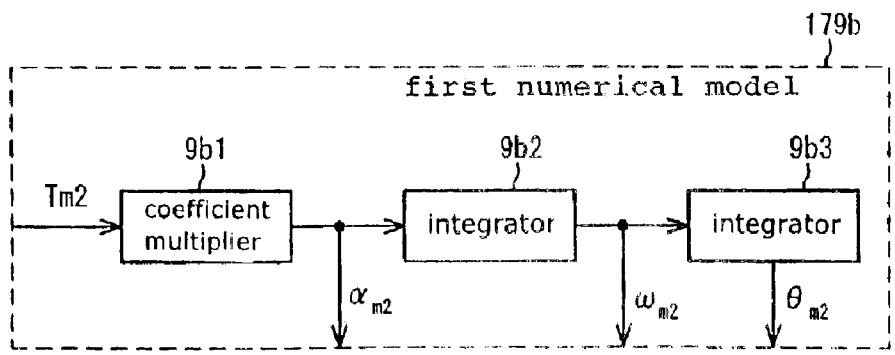
FIG. 18 is a block diagram illustrating second numerical model 179b in a motor controller according to a seventeenth embodiment of the present invention.

FIG. 18 is a block diagram illustrating second numerical model 179b in the motor controller according to this embodiment. As illustrated in FIG. 18, second numerical model 179b comprises coefficient multiplier 9b1, integrator 9b2, and integrator 9b3.

Coefficient multiplier 9b1 multiplies second simulation torque signal $T_{m2}$ by a coefficient to provide second simulation acceleration signal $\alpha_{m2}$. Integrator 9b2 integrates second simulation acceleration signal $\alpha_{m2}$ to provide second simulation speed signal $\omega_{m2}$. Integrator 9b3 integrates second simulation speed signal $\omega_{m2}$ to provide second simulation position signal $\theta_{m2}$.

By fixing second numerical model 179b to a rigid body mode, the motor controller according to this embodiment can further reduce an error between actual position signal $\theta$ and commanded rotation angle signal $\theta_{ref}$ of machine system 6, and simultaneously reduce high frequency components included in actual torque command T when machine system 6 is a rigid body system.

Eighteenth Embodiment

Next, detailed description will made on a motor controller according to an eighteenth embodiment of the present invention.

The motor controller according to this embodiment employs second simulation controller 19a which is another embodiment of second simulation controller 9a in the motor controller according to the fifteenth embodiment.

Figure 19:
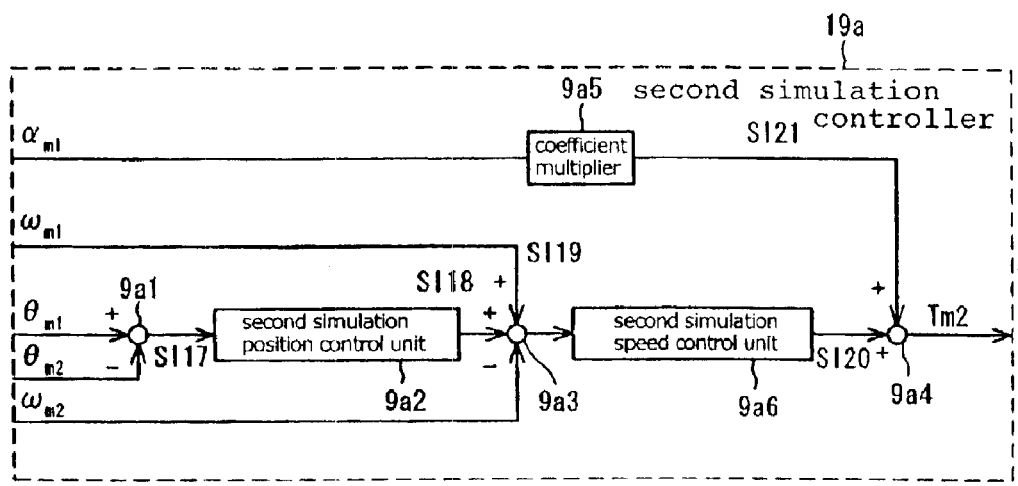
FIG. 19 is a block diagram illustrating a second simulation controller 19a in a motor controller according to an eighteenth embodiment of the present invention.

FIG. 19 is a block diagram illustrating the configuration of second simulation controller 19a. As illustrated in FIG. 19, second simulation controller 19a comprises subtractor 9a1, second simulation position control unit 9a2, subtractor 9a3, second simulation speed control unit 9a6, coefficient multiplier 9a5, and adder 9a4.

Subtractor 9a1 subtracts second simulation position signal $\theta_{m2}$ from first simulation position signal $\theta_{m1}$ to provide seventeenth simulation signal SI17. Second simulation position control unit 9a2 multiplies seventeenth simulation signal SI17 by $K_{P2}$ as expressed by the following equation (27), and provides the product as eighteenth simulation signal SI18:

$$SI18 = K_{P2} \times SI17 \tag{27}$$

where $K_{P2}$ is a position proportional control gain of second simulation position control unit 9a2.

Adder/subtractor 9a3 subtracts second simulation speed signal $\omega_{m2}$ from the sum of eighteenth simulation signal SI18 and first simulation speed signal $\omega_{m1}$, and provides the difference signal as nineteenth simulation signal SI19.

Second simulation speed control unit 9a6 multiplies nineteenth simulation signal SI19 by $K_{V2}$ as expressed by the following equation (28) to provide twentieth simulation signal SI20:

$$SI20 = K_{V2} \times SI19 \tag{28}$$

where $K_{V2}$ is a speed proportional control gain of second simulation speed control unit 9a6.

Coefficient multiplier 9a5 receives first simulation acceleration signal $\alpha_{m1}$, calculates twenty first simulation signal SI21 in accordance with the following equation (29), and provides the calculated signal:

$$SI21 = J_{m2} \times \alpha_{m1} \tag{29}$$

Adder 9a4 adds twentieth simulation signal SI20 and twenty first simulation signal SI21 to provide second simulation torque signal $T_{m2}$.

In the motor controller according to this embodiment, second simulation controller 19a can be readily implemented by an electric circuit or the like by separating the control operations expressed by the aforementioned equations (22) or (26) and the like into second simulation position control unit 9a2, second simulation speed control unit 9a6 and coefficient multiplier 9a5.

The motor controller according to this embodiment can set each gain of second simulation position control unit 9a2 to a small value to readily maintain the stability of the motor controller by separating the operation for generating twentieth simulation signal SI20 into second simulation position control unit 9a2 and second simulation speed control unit 9a6.

Nineteenth Embodiment

Next, detailed description will be made on a motor controller according to a nineteenth embodiment of the present invention.

The motor controller according to this embodiment employs second simulation controller 29a which is another embodiment of second simulation controller 9a in the motor controller according to the fifteenth embodiment.

Figure 20:
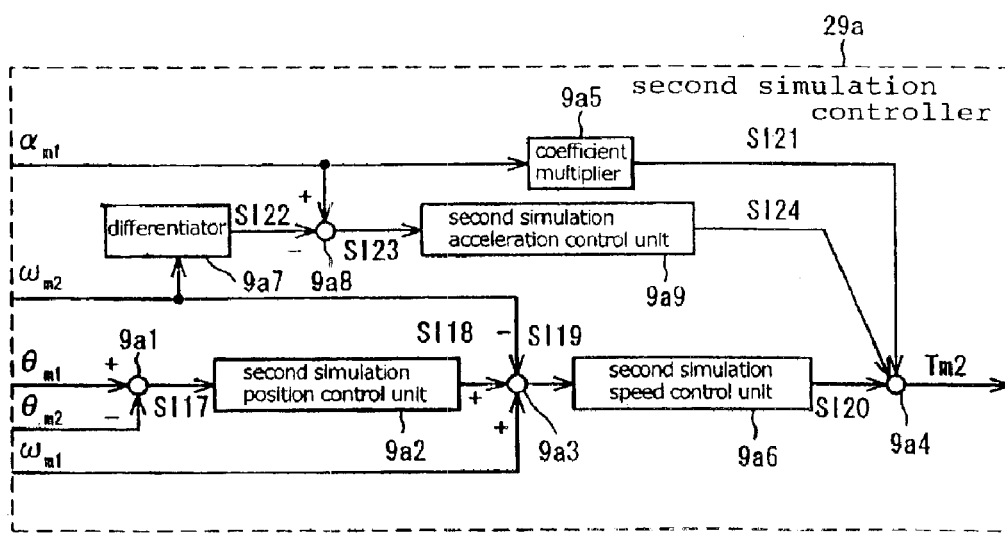
FIG. 20 is a block diagram illustrating second simulation controller 29a in a motor controller according to a nineteenth embodiment of the present invention.

FIG. 20 is a block diagram illustrating the configuration of second simulation controller 29a. As illustrated in FIG. 20, second simulation controller 29a comprises extra differentiator 9a7, subtractor 9a8, and second simulation acceleration control unit 9a9 in addition to the components in second simulation controller 19a of FIG. 19.

Differentiator 9a7 differentiates second simulation speed signal $\omega_{m2}$ to provide twenty second simulation signal SI22. Subtractor 9a8 subtracts twenty second simulation signal SI22 from first simulation acceleration signal $\alpha_{m1}$ to provide twenty third simulation signal SI23. Second simulation acceleration control unit 9a9 receives twenty third simulation signal SI23, calculates twenty fourth simulation signal SI24 in accordance with the following equation (30), and provides the calculated signal:

$$SI24 = K_{a2} \times SI23 \tag{30}$$

where $K_{a2}$ is an acceleration proportional control gain.

Twenty fourth simulation signal SI24 is added to the sum of twentieth simulation signal SI20 and twenty first simulation signal SI21 by adder 9a4 to generate second simulation torque signal $T_{m2}$.

With the introduction of second simulation acceleration control unit 9a9, the motor controller according to this embodiment can bring the response characteristic of second simulation acceleration signal $\alpha_{m2}$ closer to the response characteristic of first simulation acceleration signal $\alpha_{m1}$, and more rapidly ascend second simulation position signal $\theta_{m2}$ and second simulation speed signal $\omega_{m2}$.

Twentieth Embodiment

Next, detailed description will be made on a motor controller according to a twentieth embodiment of the present invention.

The motor controller according to this embodiment employs second simulation controller 19c as another embodiment of second simulation controller 9c in the motor controller according to the sixteenth embodiment.

Figure 21:
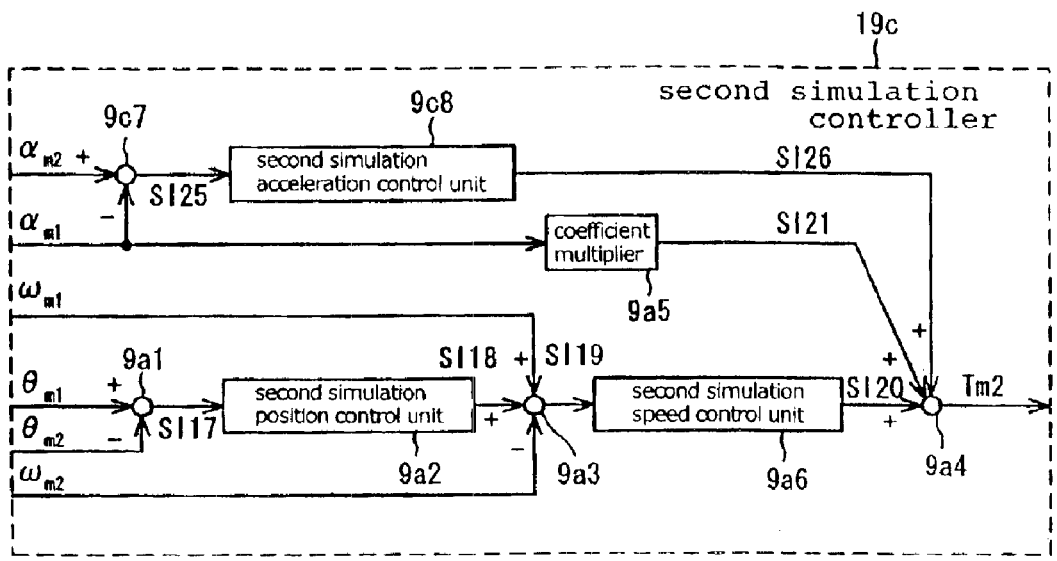
FIG. 21 is a block diagram illustrating second simulation controller 19c in a motor controller according to a twentieth embodiment of the present invention.

FIG. 21 is a block diagram illustrating the configuration of second simulation controller 19c. As illustrated in FIG. 21, second simulation controller 19c comprises subtractor 9a1, second simulation position control unit 9a2, adder/subtractor 9a3, adder 9a4, coefficient multiplier 9a5, and second simulation speed control unit 9a6, similar to second simulation controller 19a of FIG. 19, and additionally comprises subtractor 9c7 and second simulation position control unit 9c2.

Subtractor 9c7 subtracts first simulation acceleration signal $\alpha_{m1}$ from second simulation acceleration signal $\alpha_{m2}$ to provide twenty fifth simulation signal SI25. Second simulation acceleration control unit 9c8 multiplies twenty fifth simulation signal SI25 by a coefficient to provide twenty sixth simulation signal SI26. Twenty first simulation signal SI21 is applied to adder 9a4 which adds it to twenty sixth simulation signal SI26 and twentieth simulation signal SI20 to provide second simulation torque signal $T_{m2}$.

The motor controller according to this embodiment can set a smaller value to control gain $K_{P2}$ of second simulation position control unit 9a2 than in an exclusive position control by separating the operation for generating the twentieth simulation signal SI20 into second simulation position control unit 9a2 and second simulation speed control unit 9a6.

Twenty First Embodiment

Figure 22:
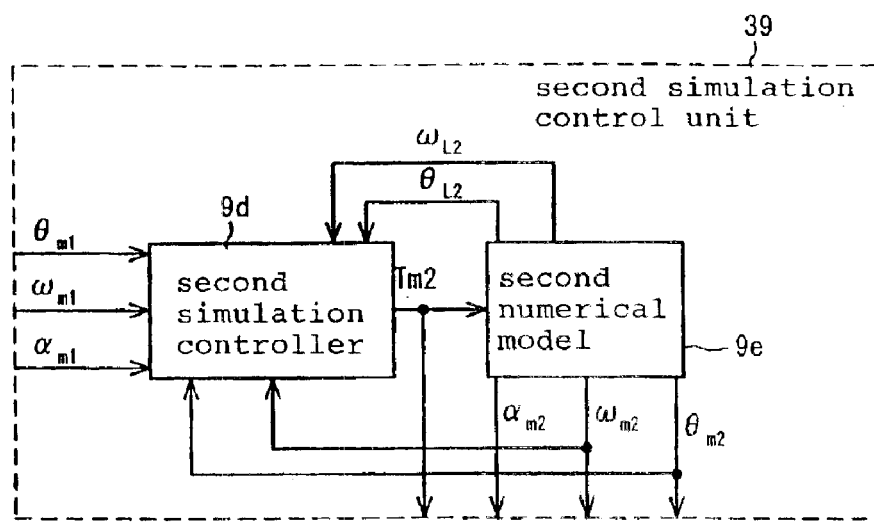
FIG. 22 is a block diagram illustrating second simulation control unit 39 in a motor controller according to a twenty first embodiment of the present invention.

Next, detailed description will be made on the configuration of a motor controller according to a twenty first embodiment of the present invention. The motor controller according to this embodiment differs from the motor controller according to the fifteenth embodiment in that second simulation control unit 39 is provided instead of providing second simulation control unit 19 of FIG. 16. FIG. 22 is a block diagram illustrating the configuration of second simulation control unit 39. As illustrated in FIG. 22, second simulation control unit 39 comprises second numerical model 9e and second simulation controller 9d.

Second simulation controller 9d receives first simulation position signal $\theta_{m1}$, first simulation speed signal $\omega_{m1}$, first simulation acceleration signal $\alpha_{m1}$, second simulation position signal $\theta_{m2}$, second simulation speed signal $\omega_{m2}$, second simulation acceleration signal $\alpha_{m2}$, third simulation position signal $\theta_{L2}$, and third simulation speed signal $\omega_{L2}$, and calculates second simulation torque signal $T_{m2}$ in accordance with following equation (31), and provides second simulation torque signal $T_{m2}$:

$$T_{m2}=J_{m2}\times\alpha_{m1}-J_{m4}\times\alpha_{m2}+J_{m3}\times\{K_3(\theta_{m1}-\theta_{m2})-K_4(\omega_{m1}-\omega_{m2})\}-K_5\times\theta_{L2}-K_6\times\omega_{L2} \quad (31)$$

Second numerical model $9e$ receives second simulation torque signal $T_{m2}$, and solves the following equations (32)–(37) to provide second simulation acceleration signal $\alpha_{m2}$, second simulation speed signal $\omega_{m2}$, second simulation position signal $\theta_{m2}$, third simulation position signal $\theta_{L2}$, and third simulation speed signal $\omega_{L2}$:

$$\alpha_{m2}=(T_{m2}-Tk)/(J_{m5}) \quad (32)$$

$$\omega_{m2}=(T_{m2}-Tk)/(J_{m5}\times s) \quad (33)$$

$$\theta_{m2}=(T_{m2}-Tk)/(J_{m5}\times s^2) \quad (34)$$

$$\theta_{L2}=Tk/(J_{m6}\times s^2) \quad (35)$$

$$\theta_{L2}=Tk/(J_{m6}\times s) \quad (36)$$

$$Tk=Kc\times(\theta_{m2}-\theta_{L2}) \quad (37)$$

where $J_{m5}$, $J_{m6}$ are inertia, $Kc$ is a control gain, and $Tk$ is a simulation torsional torque signal.

Second simulation controller $9d$ performs a feedback control using third simulation position signal $\theta_{L2}$ and third simulation speed signal $\omega_{L2}$ fed back from second numerical model $9e$ which models a two-inertia system, so that the motor controller according to this embodiment can generate appropriate second simulation torque signal $T_{m2}$, second simulation acceleration signal $\alpha_{m2}$, second simulation speed signal $\omega_{m2}$, and second simulation angle signal $\theta_{m2}$ even when machine system 6 is a two-inertia system.

Twenty Second Embodiment

Figure 23:
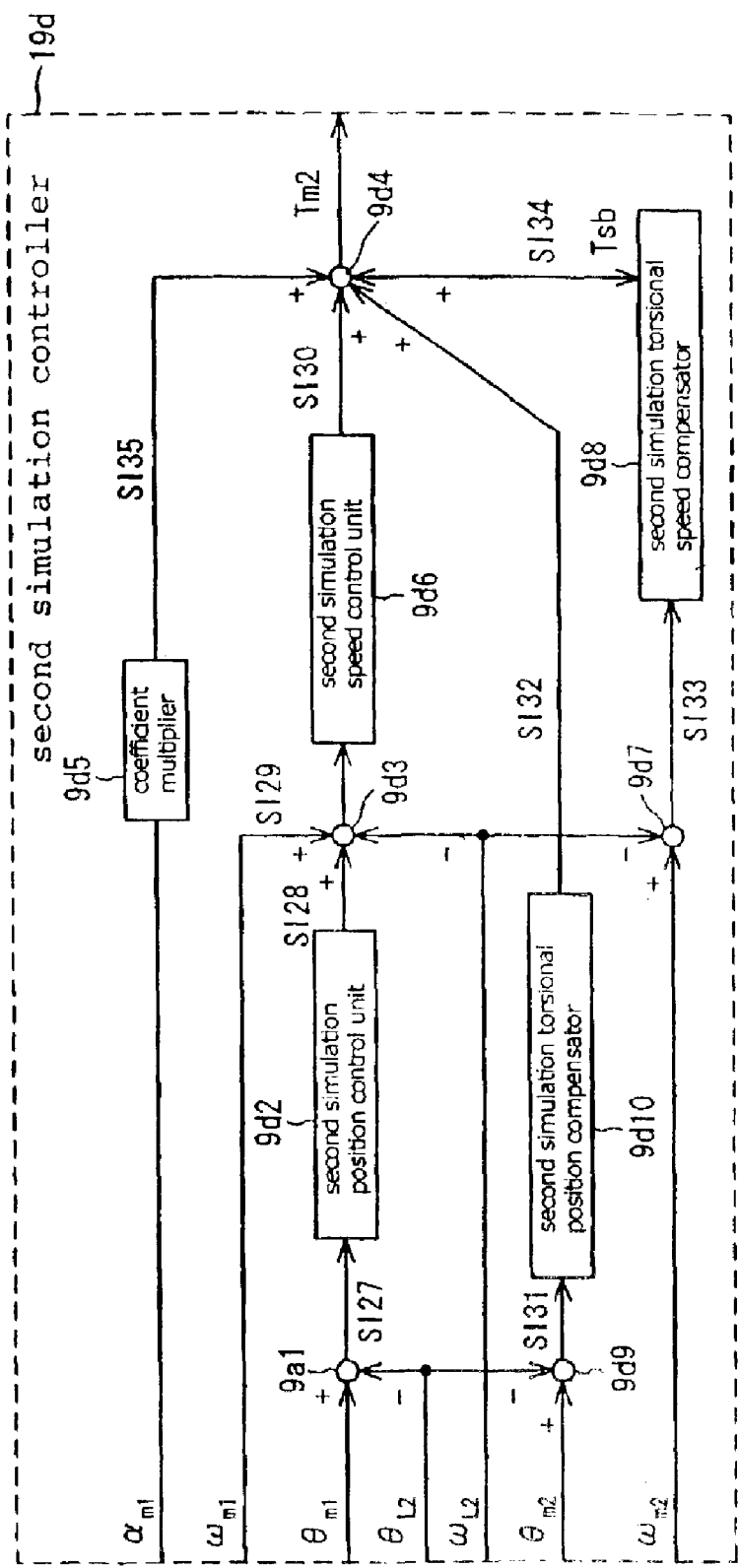
FIG. 23 is a block diagram illustrating the configuration of second simulation controller 19d in a motor controller according to a twenty second embodiment of the present invention.

Next, detailed description will be made on a motor controller according to a twenty second embodiment of the present invention. The motor controller according to this embodiment employs second simulation controller $19d$ instead of second simulation controller $9d$ used in the motor controller according to the twenty first embodiment. FIG. 23 is a block diagram illustrating the configuration of second simulation controller $19d$. As illustrated in FIG. 23, second simulation controller $9d$ comprises subtractor $9d1$, second simulation position controller $9d2$, adder/subtractor $9d3$, adder $9d4$, coefficient multiplier $9d5$, second simulation speed control unit $9d6$, subtractor $9d7$, subtractor $9d9$, second simulation torsional position compensator $9d10$, second simulation torsional speed compensator $9d8$.

Figure 24:
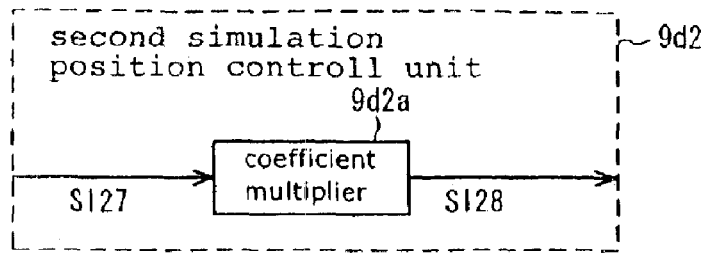
FIG. 24 is a block diagram illustrating the configuration of second simulation position control unit 9d2.

Subtractor $9d1$ subtracts third simulation speed signal $\omega_{L2}$ from first simulation position signal $\theta_{m1}$ to provide twenty seventh simulation signal SI27. Second simulation position control unit $9d2$ provides twenty eighth simulation signal SI28 based on twenty seventh simulation signal SI27. FIG. 24 illustrates the configuration of second simulation position control unit $9d2$. Second simulation position control unit $9d2$ comprises coefficient multiplier $9d2a$. Coefficient multiplier $9d2a$ multiplies twenty seventh simulation signal SI27 by $K_{P2}$ to provide twenty eighth simulation signal SI28.

Figure 25:
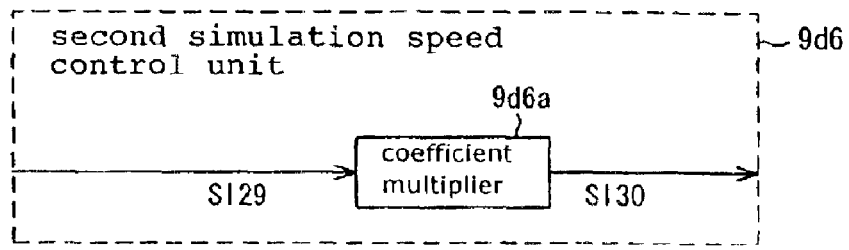
FIG. 25 is a block diagram illustrating the configuration of second simulation speed control unit 9d6.

Adder/subtractor $9d3$ subtracts third simulation speed signal $\omega_{L2}$ from the sum of twenty eighth simulation signal SI28 and first simulation speed signal $\omega_{m1}$ to provide twenty ninth simulation signal SI29. Second simulation speed control unit $9d6$ provides thirtieth simulation signal SI30 based on twenty ninth simulation signal SI29. FIG. 25 illustrates the configuration of second simulation speed control unit $9d6$. Second simulation position control unit $9d6$ comprises coefficient multiplier $9d6a$. Coefficient multiplier $9d6a$ multiplies twenty ninth simulation signal SI29 by a coefficient to provide thirtieth simulation signal SI30.

Subtractor $9d9$ subtracts the aforementioned third simulation position signal $\theta_{L2}$ from second simulation position signal $\theta_{m2}$ to provide thirty first simulation signal SI31.

Figure 26:
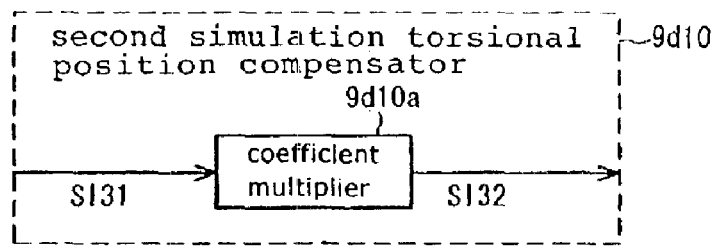
FIG. 26 is a block diagram illustrating the configuration of second simulation torsional position compensator 9d10.

Second simulation torsional position compensator $9d10$ provides thirty second simulation signal SI32 based on thirty first simulation signal SI31. FIG. 26 illustrates the configuration of second simulation torsional position compensator $9d10$. Second simulation torsional position compensator $9d10$ comprises coefficient multiplier $9d10a$. Coefficient multiplier $9d10a$ calculates thirty second simulation signal SI32 in accordance with the following equation (38), and provides the calculated signal:

$$SI32=K_{P3}\times SI31 \quad (38)$$

where $K_{P3}$ is a position proportional control gain.

Subtractor $9d7$ subtracts the aforementioned third simulation speed signal $\omega_{L2}$ from second simulation speed signal $\omega_{m2}$ to provide thirty third simulation signal SI33.

Figure 27:
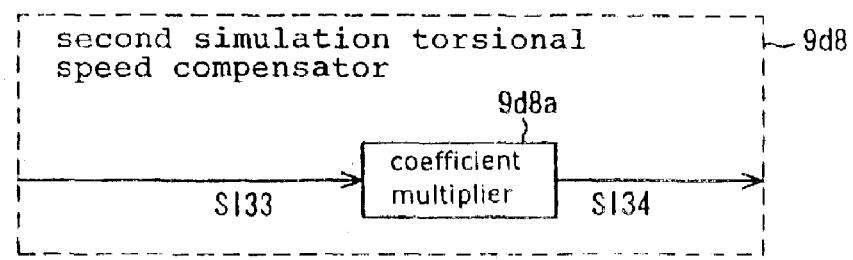
FIG. 27 is a block diagram illustrating the configuration of second simulation torsional speed compensator 9d8.

Second simulation torsional speed compensator $9d8$ receives thirty third simulation signal SI33 to provide thirty fourth simulation signal SI34. FIG. 27 illustrates the configuration of second simulation torsional speed compensator $9d8$. Second simulation torsional speed compensator $9d8$ comprises coefficient multiplier $9d8a$. Coefficient multiplier $9d8a$ calculates thirty fourth simulation signal SI34 from thirty third simulation signal SI33 in accordance with the following equation (39) and provides thirty fourth simulation signal SI34:

$$SI34=K_{V3}\times SI33 \quad (39)$$

where $K_{V3}$ is speed proportional control gain.

Coefficient multiplier $9d5$ multiplies first simulation acceleration signal $\alpha_{m1}$ by a coefficient to provide thirty fifth simulation signal SI35. Adder $9d4$ adds thirtieth simulation signal SI30, thirty second simulation signal SI32, thirty fourth simulation signal SI34 and thirty fifth simulation signal SI35 to provide second simulation torque signal $T_{m2}$.

With the addition of second simulation torsional position compensator $9d10$ and second simulation torsional speed compensator $9d8$, the motor controller according to this embodiment can generate appropriate second simulation torque signal $T_{m2}$ even when machine system 6 is a two-inertia system.

Also, the motor controller according to this embodiment can set a smaller value to control gain $K_{P2}$ of second simulation position control unit $9d2$ than in an exclusive position control by separating the operation for generating the twentieth simulation signal SI30 into second simulation position control unit $9d2$ and second simulation speed control unit $9d6$.

Twenty Third Embodiment

Next, detailed description will be made on a motor controller according to twenty third embodiment of the present invention.

The motor controller according to this embodiment employs second simulation controller $29d$ which is another embodiment of second simulation controller $9d$ in the motor controller according to the twenty second embodiment.

Figure 28:
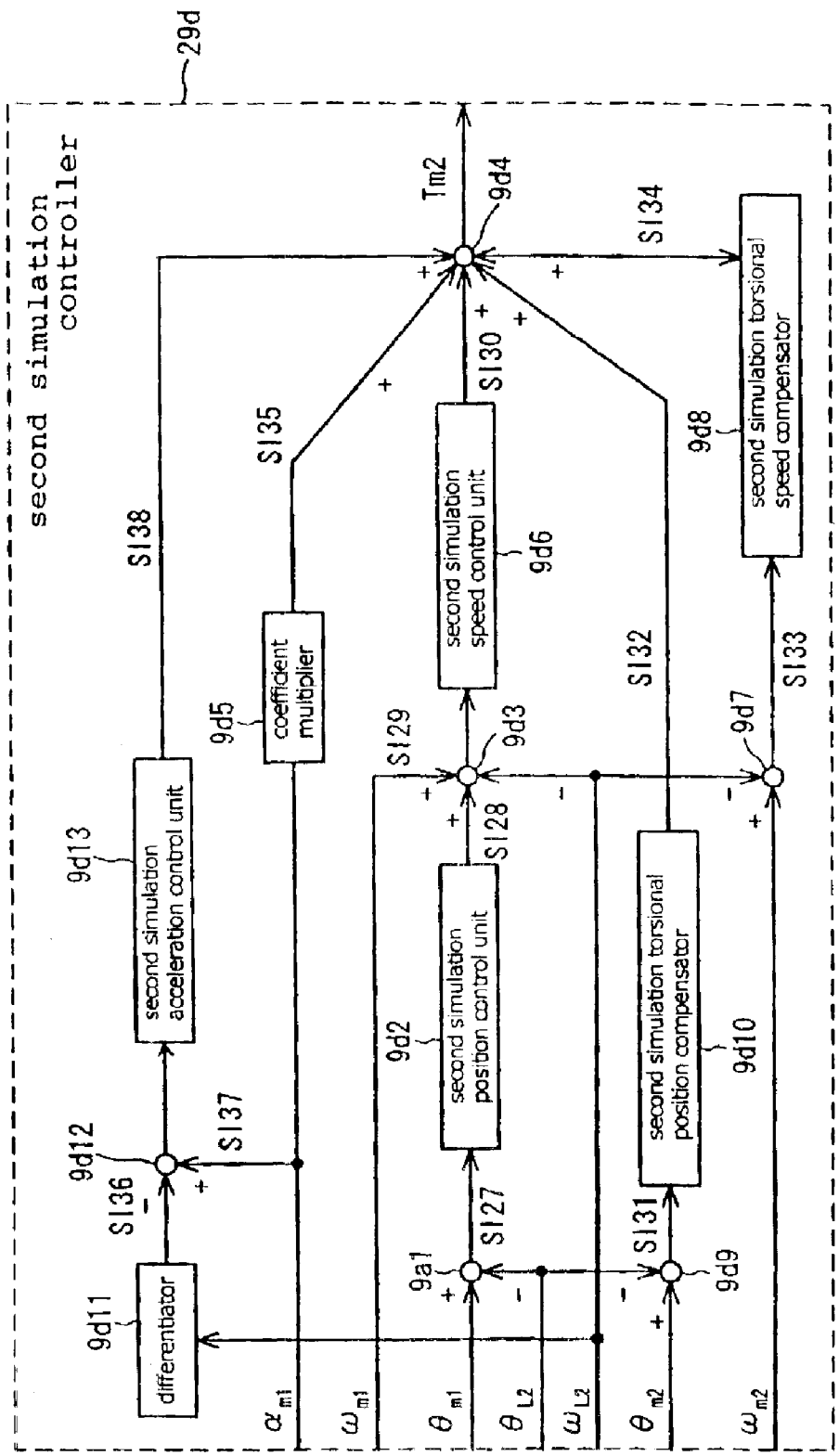
FIG. 28 is a block diagram illustrating the configuration of second simulation controller 29d in a motor controller according to a twenty third embodiment of the present invention.

FIG. 28 is a block diagram illustrating the configuration of second simulation controller $29d$. As illustrated in FIG. 28, second simulation controller $29d$ comprises extra differentiator $9d11$, subtractor $9d12$, and second simulation acceleration control unit 9d13 in addition to the components in second simulation controller 19d of FIG. 23.

Differentiator 9d11 differentiates third simulation speed signal $\omega_{L2}$ to provide thirty sixth simulation signal SI36. Subtractor 9d12 subtracts thirty sixth simulation signal SI36 from first simulation acceleration signal $\alpha_{m1}$ to provide thirty seventh simulation signal SI37.

Second simulation acceleration control unit 9d13 receives thirty seventh simulation signal SI37, calculates thirty eighth simulation signal SI38 in accordance with the following equation (40), and provides the calculated signal:

$$SI38 = K_{a3} \times SI37 \qquad (40)$$

where $K_{a3}$ is an acceleration proportional control gain.

Adder 9d4 adds thirtieth simulation signal SI30, thirty second simulation signal SI30, thirty fourth simulation signal SI34, thirty fifth simulation signal SI35 and thirty eighth simulation signal SI38 to provide second simulation torque signal $T_{m2}$.

With the addition of second simulation acceleration control unit 9d13, the motor controller according to this embodiment can generate appropriate second simulation torque signal $T_{m2}$ such that third simulation speed signal $\omega_{L2}$ can have the response characteristic close to that of first simulation speed signal $\omega_{m1}$ to readily speed up the control response of machine system 6, even when machine system 6 is a two-inertia system.

Twenty Fourth Embodiment

Next, detailed description will be made on a motor controller according to a twenty fourth embodiment of the present invention.

Figure 29:
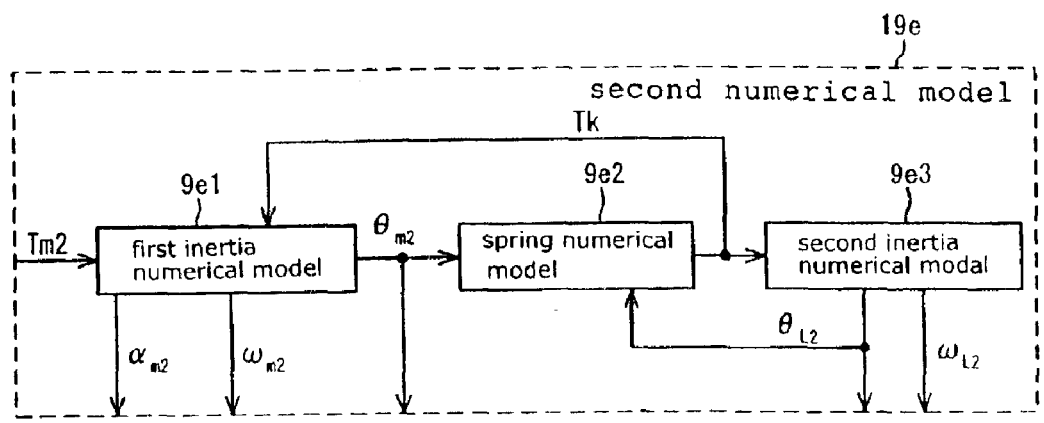
FIG. 29 is a block diagram illustrating the configuration of second numerical model 19e in a motor controller according to a twenty fourth embodiment of the present invention.

The motor controller according to this embodiment employs second numerical model 19e instead of second numerical model 9e used in the motor controller according to the twenty first embodiment. FIG. 29 is a block diagram illustrating the configuration of second numerical model 19e. As illustrated in FIG. 29, second numerical model 19e comprises first inertia system numerical model 9e1, spring numerical model 9e2, and second inertia system numerical model 9e3.

First inertia system numerical model 9e1 receives second simulation torque signal $T_{m2}$, calculates second simulation position signal $\theta_{m2}$, second simulation speed signal $\omega_{m2}$, and second simulation acceleration signal $\alpha_{m2}$ in accordance with the following equations (41)–(43), and provides the calculated signals:

$$\alpha_{m2} = (T_{m2} - Tk)/(J_{m5}) \qquad (41)$$

$$\omega_{m2} = \alpha_{m2}/s \qquad (42)$$

$$\theta_{m2} = \omega_{m2}/s \qquad (43)$$

Figure 30:
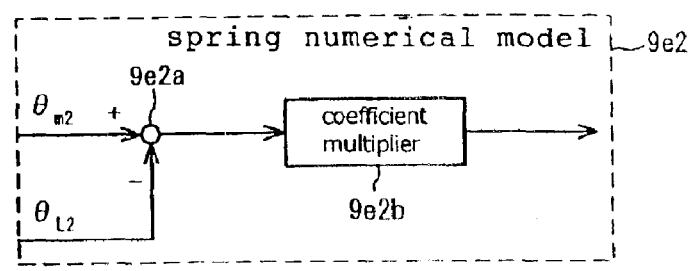
FIG. 30 is a block diagram illustrating the configuration of spring numerical model 9e2.

Spring numerical model 9e2, which has the configuration as in FIG. 30, receives second simulation position signal $\theta_{m2}$ and third simulation position signal $\theta_{L2}$, and solves the following equation (44) to provide simulation torsional torque signal Tk:

$$Tk = Kc \times (\theta_{m2} - \theta_{L2}) \qquad (44)$$

Second inertia system numerical model 9e3 calculates third simulation position signal $\theta_{L2}$ and third simulation speed signal $\omega_{L2}$ in accordance with the following equations (45), (46) based on simulation torsional torque signal Tk, and provides the calculated signals:

$$\omega_{L2} = Tk/(J_{m6} \times s) \qquad (45)$$

$$\theta_{L2} = \omega_{L2}/s \qquad (46)$$

In addition, first inertia system numerical model 9e1 may impose limitations to second simulation torque signal $T_{m2}$ as following equation (47):

$$T_{m2} = T\max \quad (T_{m2} \geq T\max)$$

$$T_{m2} = -T\max \quad (T_{m2} - < T\max) \qquad (47)$$

where Tmax is a maximum torque of the electric motor.

By doing so, the motor controller according to this embodiment an generate more appropriate second simulation torque signal $T_{m2}$.

As described above, the motor controller according to this embodiment can achieve a response of the second numerical model similar to the response of machine system 6 by forming the second numerical model of the two inertia system models and spring numerical model, and can reduce high frequency components included in torque command T, when machine system 6 can be approximated by a two-inertia spring vibration system.

Twenty Fifth Embodiment

Next, detailed description will be made on a motor controller according to a twenty fifth embodiment of the present invention.

This embodiment illustrates an embodiment of actual control means in the motor controller according to the present invention, and in the motor controllers according to this embodiment and twenty sixth and twenty seventh embodiments, those illustrated in the first through twenty fourth embodiments are applied to the first simulation control means, second simulation control means, and the like.

Figure 31:
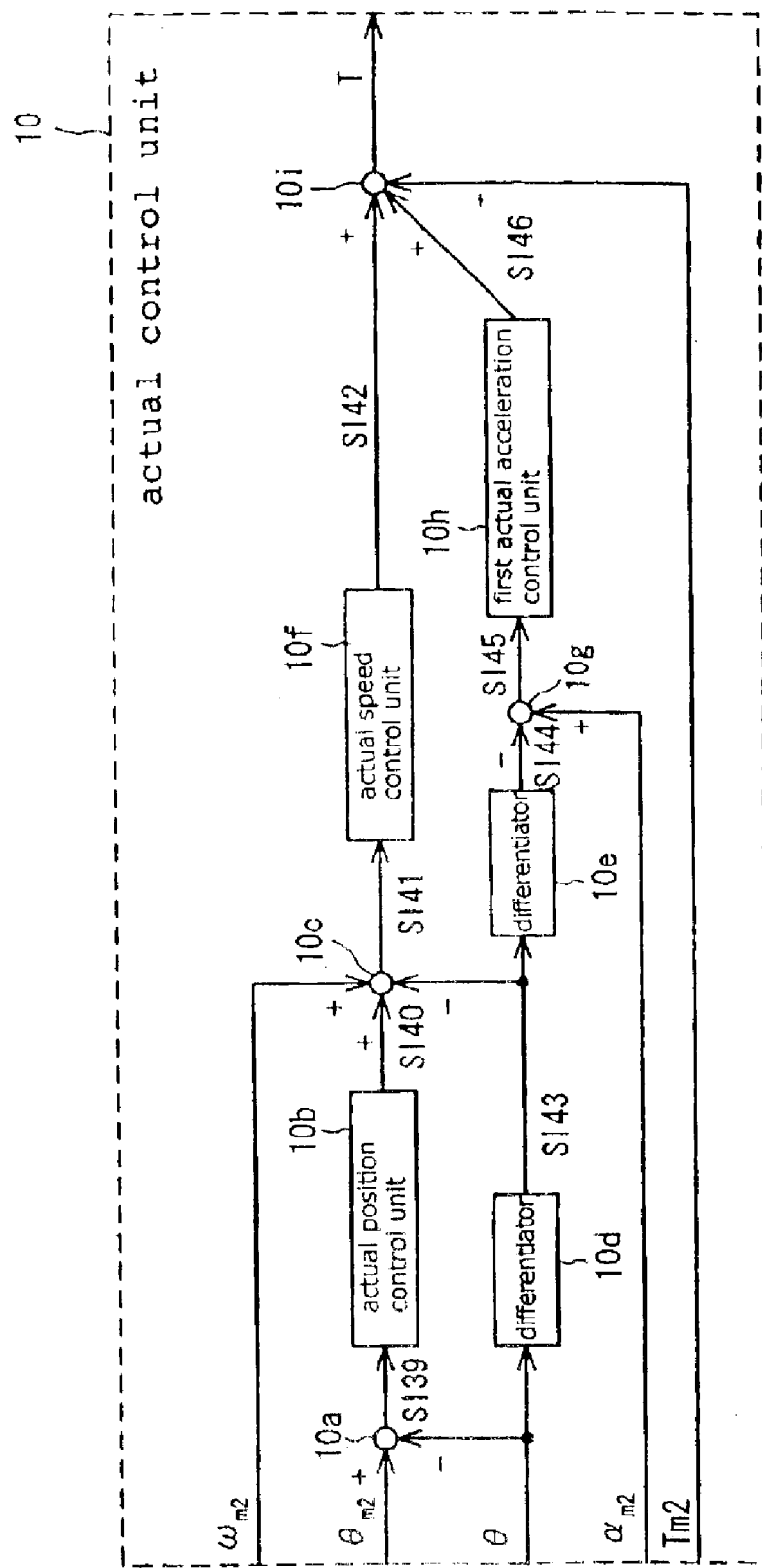
FIG. 31 is a block diagram illustrating the configuration of actual control unit 10 in a motor controller according to a twenty fifth embodiment of the present invention.

FIG. 31 is a block diagram illustrating the configuration of actual control unit 10 in the motor controller according to this embodiment. As illustrated in FIG. 31, actual control unit 10 comprises subtractor 10a, actual position control unit 10b, differentiator 10d, subtractor 10c, actual speed control unit 10f, differentiator 10e, subtractor 10g, first actual acceleration control unit 10h, and adder 10i.

Subtractor 10a subtracts actual rotation angle signal $\theta$ from second simulation position signal $\theta_{m2}$, and provides the difference value as thirty ninth simulation signal SI39. Actual position control unit 10b receives thirty ninth simulation signal SI39, performs a position control, and provides fortieth simulation signal SI40.

Differentiator 10d provides forty third simulation signal SI43 based on actual rotation angle signal $\theta$. Adder/subtractor 10c subtracts forty third simulation signal SI43 from the sum of second simulation speed signal $\omega_{m2}$ and fortieth simulation signal SI40 to generate and provide forty first simulation signal SI41. Actual speed control unit 10f differentiates forty first simulation signal SI41, and provides the differentiated signal as forty second simulation signal SI42.

Differentiator 10e differentiates forty third simulation signal SI43, and provides the differentiated signal as forty fourth simulation signal SI44. Subtractor 10g subtracts forty fourth simulation signal SI44 from second simulation acceleration signal $\alpha_{m2}$, and provides the difference value as forty fifth simulation signal SI45.

First actual acceleration control unit 10h receives forty fifth simulation signal SI45, and solves the following equation (48) to provide forty sixth simulation signal SI46:

$$SI46 = K_a \times SI45 \qquad (48)$$

where $K_a$ is an acceleration proportional control gain.

Adder 10i adds forty second simulation signal SI42, forty sixth simulation signal SI46 and second simulation torque signal $T_{m2}$ to provide the sum value as torque command T.

In the motor controller according to this embodiment, actual rotation angle signal can also have the characteristic close to second simulation position signal $\theta_{m2}$ with the addition of first actual acceleration control unit 10h, even if a slight model error exists between second numerical model and machine system 6.

The motor controller according to this embodiment can further reduce an error in response between machine system 6 and second numerical model with the addition of first actual acceleration controller to actual control unit 10.

Twenty Sixth Embodiment

Next, detailed description will be made on a twenty sixth embodiment of the present invention.

Figure 32:
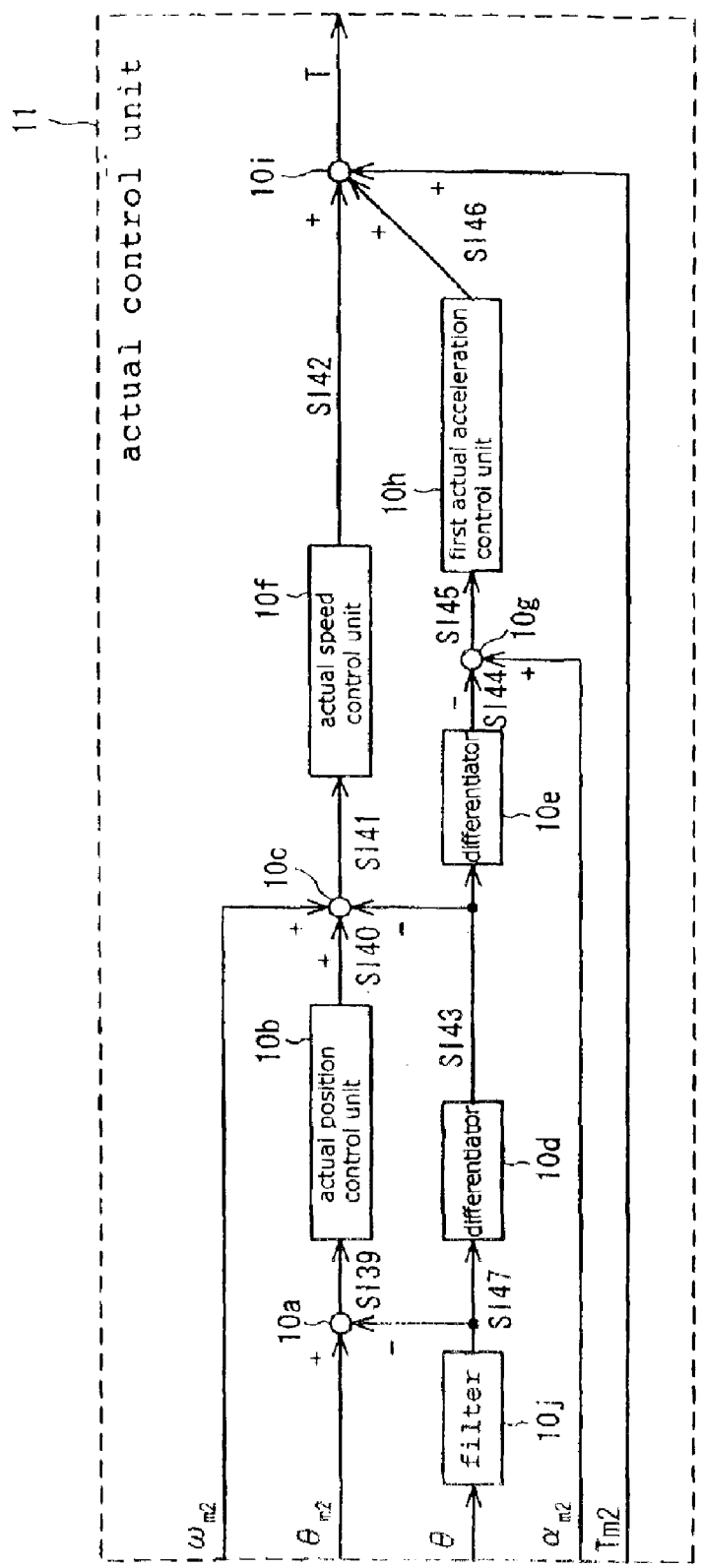
FIG. 32 is a block diagram illustrating the configuration of actual control unit 11 in a motor controller according to a twenty sixth embodiment of the present invention.

FIG. 32 is a block diagram illustrating the configuration of actual controller 11 in the motor controller according to this embodiment. As illustrated in FIG. 32, actual controller 11 comprises filter 10j in addition to the configuration of actual control unit 10 in FIG. 31. Filter 10j receives actual rotation angle signal $\theta$, and solves the following equation (49) to provide forty seventh simulation signal SI47 which is applied to subtractor 10a and differentiator 10d:

$$SI47=\theta/(T_4 \times s+1) \tag{49}$$

where $T_4$ is a time constant.

With the inclusion of filter 10j, the motor controller according to this embodiment can reduce a deleterious effect on the response characteristic of actual torque signal T resulting from noise and quantizing error included in actual rotation angle signal $\theta$.

Twenty Seventh Embodiment

Figure 33:
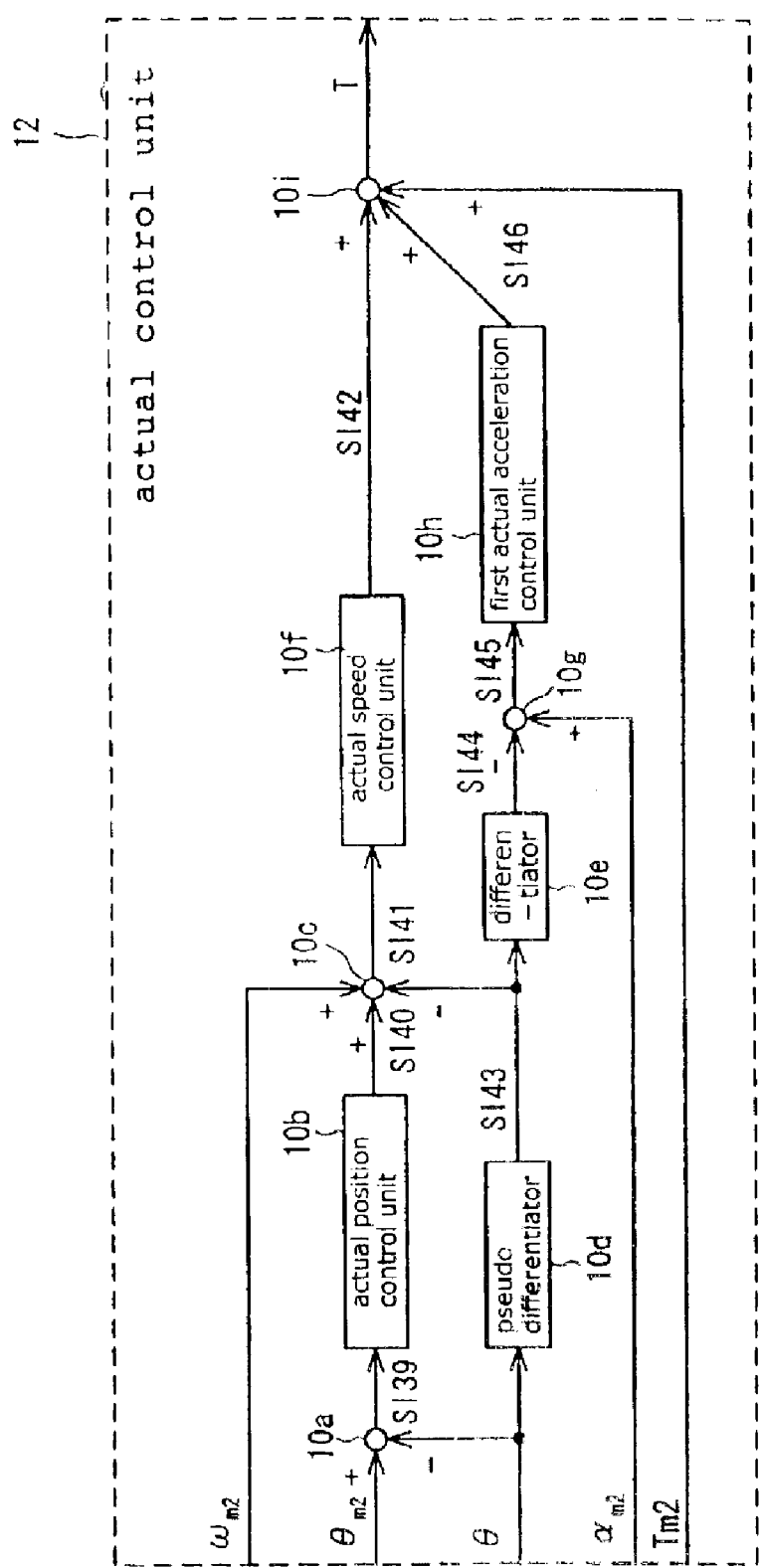
FIG. 33 is a block diagram illustrating the configuration of actual control unit 12 in a motor controller according to a twenty seventh embodiment of the present invention.

Next, detailed description will be made on a motor controller according to a twenty seventh embodiment of the present invention. FIG. 33 is a block diagram illustrating the configuration of actual control unit 12. As illustrated in FIG. 33, actual control unit 12 has pseudo differentiator 10k which is inserted in place of differentiator 10d in actual control unit 10 of FIG. 31. Pseudo differentiator 10k receives actual rotation angle signal $\theta$, and solves the following equation (50) to provide forty third simulation signal SI43:

$$SI43=\theta/(T_5 \times s+1) \tag{50}$$

where $T_5$ is a time constant.

Generally, the level of noise included in actual rotation angle signal $\theta$ is smaller than the level of noise included in a differentiated actual rotation angle signal $\theta$, so that the noise included in actual rotation angle signal $\theta$ merely exerts an inappreciable deleterious effect on actual torque signal T. Rather, actual rotation angle signal $\theta$ often suffers from a delay in phase by filtering actual rotation angle signal $\theta$, resulting in a serious exacerbation of the response characteristic of actual torque signal T.

Thus, in the motor controller according to this embodiment, actual rotation angle signal $\theta$ is applied to actual position control unit 10b without filtering, while differentiated actual rotation angle signal $\theta$ alone is filtered, thereby making it possible to reduce a deleterious effect on the response characteristic of actual torque signal T due to the noise and quantizing error included in differentiated actual rotation angle signal $\theta$ and to prevent a phase delay of actual rotation angle signal $\theta$ caused by the filtering.

Consequently, the motor controller according to this embodiment can improve the phase characteristic of position control without applying manipulations to the actual position signal.

In the motor controllers according to the first through twenty seventh embodiments, the actual control unit, first simulation control unit and second simulation control unit may be comprised of a plurality of processors, wherein respective operations thereof may be implemented by software which runs on these processors. The motor controller according to each embodiment, when comprising a plurality of processors, can largely reduce a control processing time.

Twenty Eighth Embodiment

As described above, the motor controllers according to the first through twenty seventh embodiments each comprise two components: the first simulation control unit and second simulation control unit as feed forward control means for applying a command to the actual control unit which performs a feedback control. By doing so, the overall feed forward control means can be designed to meet the requirements for the high-speed property and high stability of a control response by setting a control parameter of the first simulation control unit to improve the high-speed property of the control response and setting a control parameter of the second simulation control unit to increase the stability of the control response.

However, the motor controllers according to the first through twenty seventh embodiments each imply a problem of a long actual settlement time required for electric motor 3 due to a delay of second simulation position signal $\theta_{m2}$ with respect to commanded rotation angle signal $\theta_{ref}$. In this regard, the following description will be made on motor controllers according to a twenty eighth through a thirtieth embodiment of the present invention for solving the problem.

Figure 34:
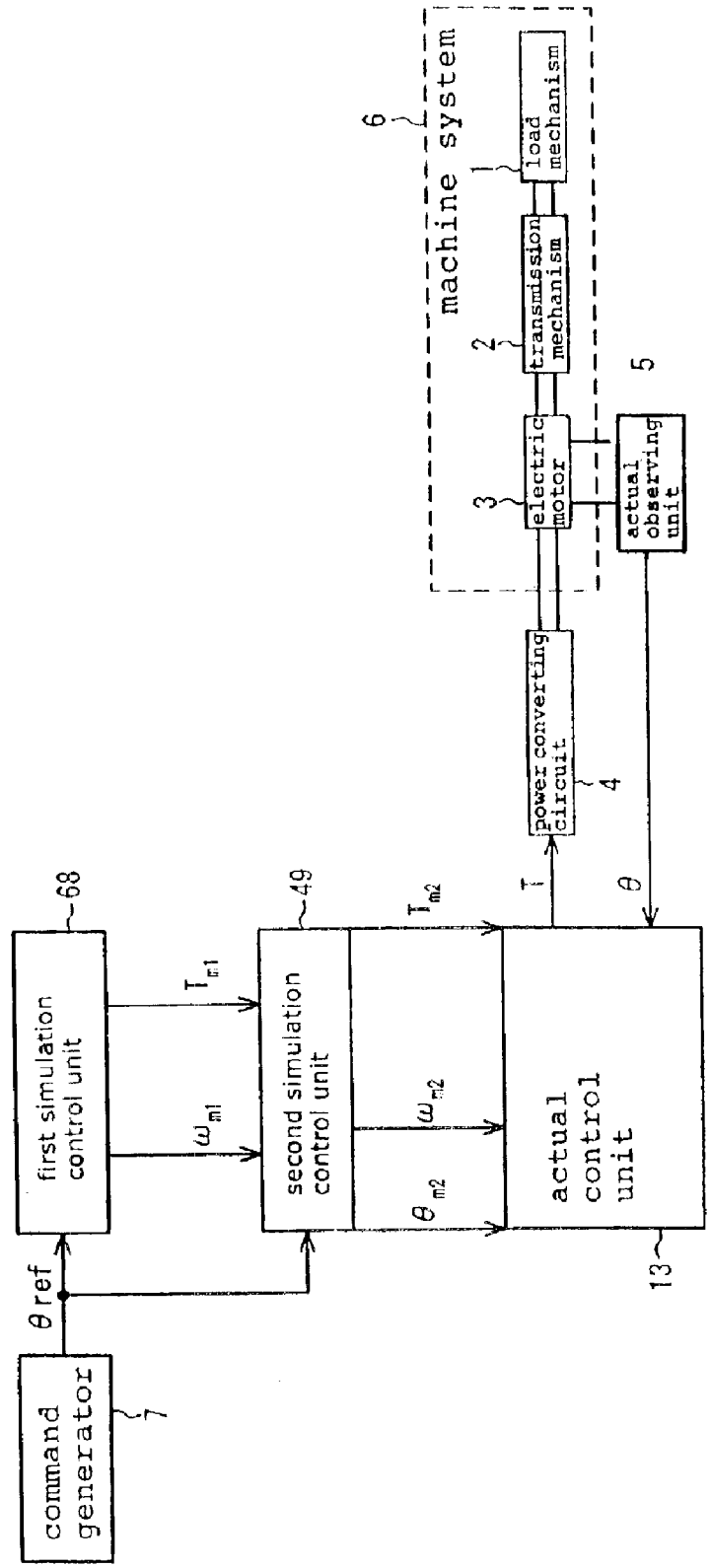
FIG. 34 is a block diagram illustrating the configuration of a motor controller according to a twenty eighth embodiment of the present invention.

Described first will be a motor controller according to the twenty eighth embodiment of the present invention in detail. FIG. 34 is a block diagram illustrating the configuration of the motor controller according to this embodiment. As illustrated in FIG. 34, the motor controller according to this embodiment differs in configuration from the motor controller of FIG. 2 in that first simulation control unit 68, second simulation control unit 49, and actual control unit 13 are provided instead of first simulation control unit 8, second simulation control unit 9, and actual control unit 10.

First simulation control unit 68 calculates first simulation speed signal $\omega_{m1}$ and first simulation torque signal $T_{m1}$ based on commanded rotation angle signal $\theta_{ref}$ provided from command generator 7 and a first control parameter, and provides the calculated signals. First simulation control unit 68 calculates first simulation speed signal $\omega_{m1}$ and second simulation torque signal $T_{m1}$ as expressed by the following equations (51), (52):

$$\omega_{m1}=s(T_1 \times s+1)^2 \times \theta_{ref} \tag{51}$$

$$T_{m1}=J \times s^2/(T_1 s+1)^2 \times \theta_{ref} \tag{52}$$

where $T_1$ is a time constant which is the first control parameter, s is a differential operator, and J is the inertia of machine system 6.

Second simulation control unit 49 performs a proportional control based on a deviation of second simulation position signal $\theta_{m2}$ from commanded rotation angle signal $\theta_{ref}$ to derive a value, performs an integral control based on a deviation of second simulation position signal $\theta_{m2}$ from commanded rotation angle signal $\theta_{ref}$ to derive a value, performs a proportional control based on a deviation of first simulation speed signal $\omega_{m1}$ from second simulation speed signal $\omega_{m2}$, adds these values and first simulation torque signal $T_{m1}$, and provides the sum as second simulation torque signal $T_{m2}$. In addition, second simulation control unit 49 integrates second simulation torque signal $T_{m2}$ once and provides the integrated value as second simulation speed signal $\omega_{m2}$, and integrates second simulation speed signal $\omega_{m2}$ once and provides the integrated value as second simulation position signal $\theta_{m2}$, Specifically, second simulation control unit 49 calculates second simulation position signal $\theta_{m2}$, second simulation speed signal $\omega_{m2}$ and second simulation torque signal $T_{m2}$ as expressed by the following equations (53)–(55):

$$\theta_{m2} = \omega_{m2}/s \qquad (53)$$

$$\theta_{m2} = T_{m2}/s \qquad (54)$$

$$T_{m2} = K_P \times (\theta_{ref} - \theta_{m2}) + K_V \times (\omega_{m1} - \omega_{m2}) + T_{m1} + K_I \times (\theta_{ref} - \theta_{m2})/s \qquad (55)$$

where $K_P$ is a first proportional gain, $K_V$ is a second proportional gain, $K_I$ is an integral gain, and s is a differential operator.

Figure 35:
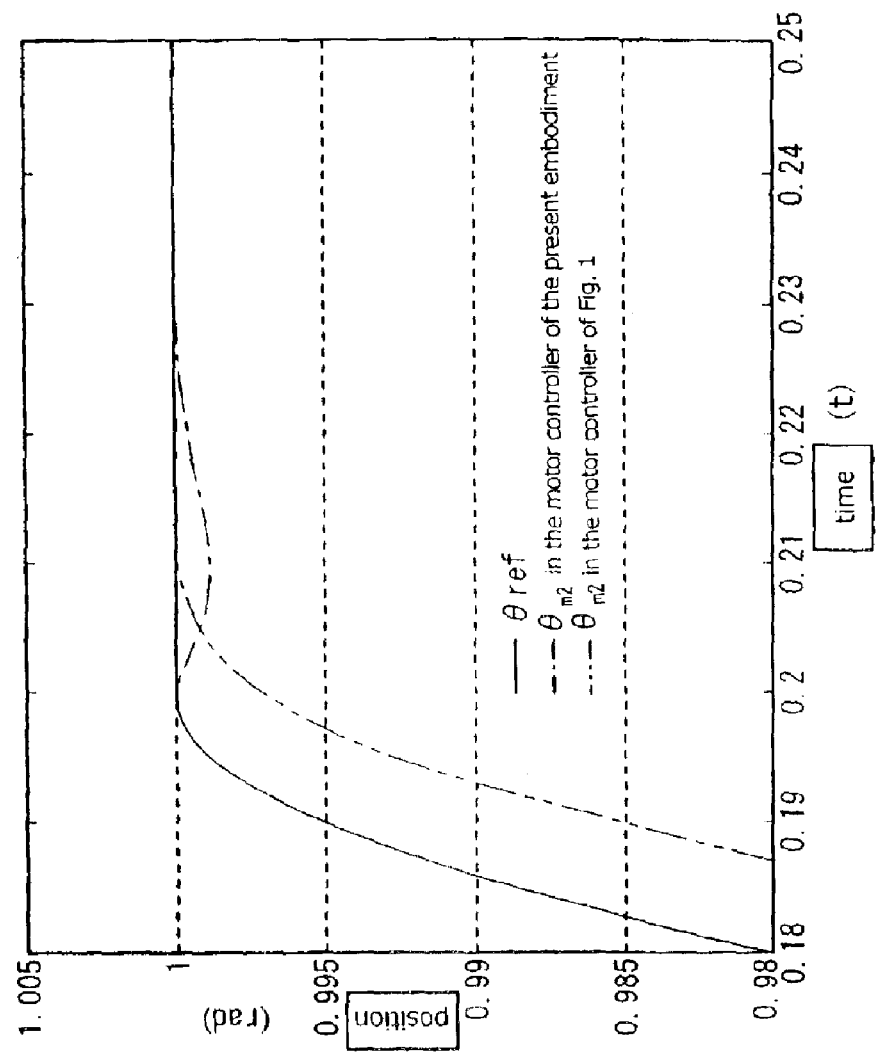
FIG. 35 is a graph showing the result of a simulation in the motor controller according to the twenty eighth embodiment of the present invention.

FIG. 35 is a graph showing the result of a simulation in the motor controller according to this embodiment. FIG. 35 shows manners of transitions in commanded rotation angle signal $\theta_{ref}$, second simulation position signal $\theta_{m2}$ in the motor controller according to this embodiment, and second simulation position signal $\theta_{m2}$ in the motor controller of FIG. 2.

As shown in FIG. 35, it can be appreciated that second simulation position signal $\theta_{m2}$ in the motor controller according to this embodiment follows commanded rotation angle signal $\theta_{ref}$ substantially without delay, though presenting slight oscillations after commanded rotation angle signal $\theta_{ref}$ reaches one, whereas second simulation position signal $\theta_{m2}$ in the motor controller of FIG. 2 delays from commanded rotation angle signal $\theta_{ref}$.

As described above, since second simulation control unit 49 performs the position control based on commanded rotation angle signal $\theta_{ref}$ and second simulation position signal $\theta_{m2}$ the motor controller according to this embodiment can reduce an actual settlement time of electric motor 3 because a delay in second simulation position signal $\theta_{m2}$ can be reduced with respect to commanded rotation angle signal $\theta_{ref}$.

Twenty Ninth Embodiment

Figure 36:
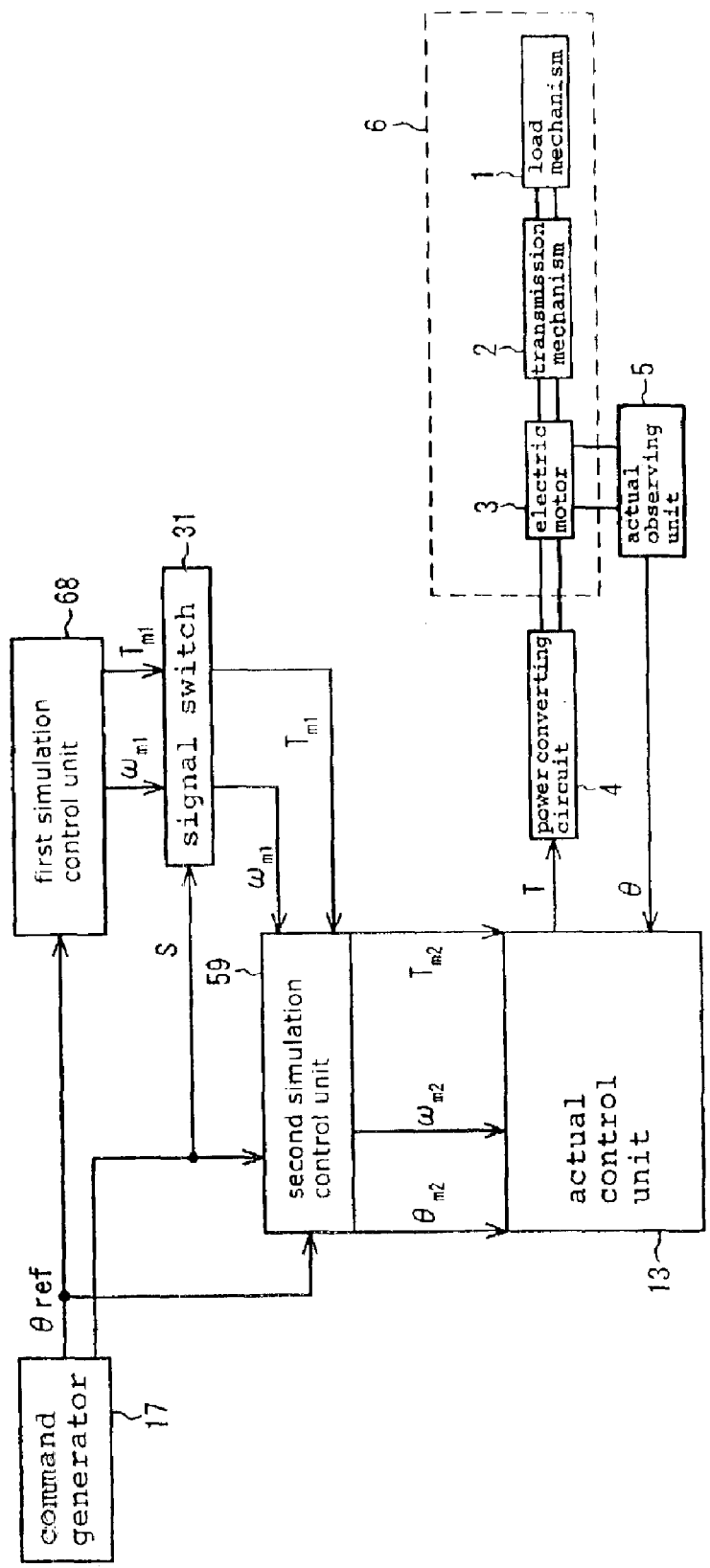
FIG. 36 is a block diagram illustrating the configuration of a motor controller according to a twenty ninth embodiment of the present invention.

Next, description will be made on a motor controller according to a twenty ninth embodiment of the present invention. FIG. 36 is a block diagram illustrating the configuration of the motor controller according to this embodiment. As illustrated in FIG. 36, the motor controller according to this embodiment differs from the motor controller of FIG. 34 in that signal switch 31 is additionally provided. Also, command generator 17 provides command completion signal S together with commanded rotation angle signal $\theta_{ref}$. Command completion signal S takes a first value when commanded rotation angle signal $\theta_{ref}$ is provided, i.e., when commanded rotation angle signal $\theta_{ref}$ is fluctuating, takes a second value when commanded rotation angle signal $\theta_{ref}$ has just been provided, i.e., when commanded rotation angle signal $\theta_{ref}$ stops fluctuating, and takes a third value when commanded rotation angle signal $\theta_{ref}$ is not provided, i.e., when commanded rotation angle signal $\theta_{ref}$ is not fluctuating. The first value is a value which satisfies S<0, the second value is zero, and the third value is a value which satisfies S>0.

Signal switch 31 applies second simulation control unit 59 with first simulation speed signal $\omega_{m1}$ and first simulation torque signal $T_{m1}$, provided from first simulation control unit 68, as they are when command completion signal S takes the first value (for example, S=−1), while sets zero to the value of first simulation speed signal $\omega_{m1}$ and the value of first simulation torque signal $T_{m1}$ applied to second simulation control unit 59 when command completion signal S takes the second value (S=0) or third value (for example, S=1).

Second simulation control unit 59 receives command completion signal S, and calculates second simulation position signal $\theta_{m2}$, second simulation speed signal $\omega_{m2}$ and second simulation torque signal $T_{m2}$ using the aforementioned equations (53)–(55) to provide the calculated values when command completion signal S takes the first value (S<0) or second value (S>0). However, when command completion signal S takes the second value, i.e., zero, second simulation control unit 59 substitutes zero into the term "$K_I \times (\theta_{ref} - \theta_{m2})/s$" in equation (55) and calculates second simulation torque signal $T_{m2}$.

Since second simulation control unit 49 performs the position control based on a deviation of second simulation position signal $\theta_{m2}$ from commanded rotation angle signal $\theta_{ref}$, the motor controller according to this embodiment can reduce an actual settlement time of electric motor 3 because a delay in second simulation position signal $\theta_{m2}$ can be reduced with respect to commanded rotation angle signal $\theta_{ref}$.

Further, the motor controller according to this embodiment clears the output of the integrator in the position control, which would cause oscillations and overshooting of second simulation position signal $\theta_{m2}$ when commanded rotation angle signal $\theta_{ref}$ stops fluctuating, and clears the output of the speed control and first simulation torque signal $T_{m1}$ when commanded rotation angle signal $\theta_{ref}$ is not fluctuating. Consequently, the motor controller according to this embodiment can limit overshooting and oscillations of second simulation position signal $\theta_{m2}$ which could occur when commanded rotation angle signal $\theta_{ref}$ stops fluctuating.

Figure 37:
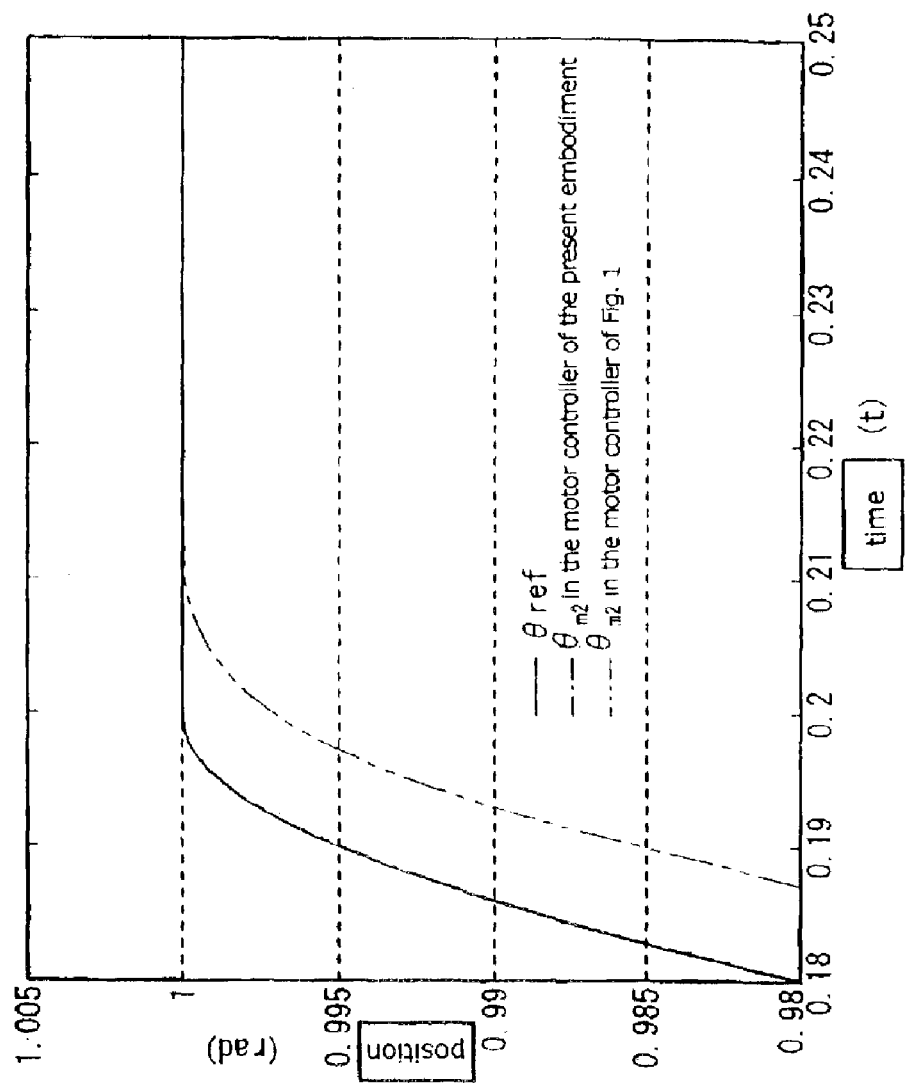
FIG. 37 is a graph showing the result of a simulation in the motor controller according to the twenty ninth embodiment of the present invention.

FIG. 37 is a graph showing the result of a simulation in the motor controller according to this embodiment. FIG. 37 shows manners of fluctuations in commanded rotation angle signal $\theta_{ref}$, second simulation position signal $\theta_{m2}$ in this embodiment, and second simulation position signal $\theta_{m2}$ in the motor controller of FIG. 2.

As shown in FIG. 37, second simulation position signal $\theta_{m2}$ in the motor controller according to this embodiment follows commanded rotation angle signal $\theta_{ref}$ substantially without delay, and moreover is free from oscillations after commanded rotation angle signal $\theta_{ref}$ reaches one, as appearing on second simulation position signal $\theta_{m2}$ of the motor controller according to the twenty eighth embodiment in FIG. 37.

Thirtieth Embodiment

Figure 38:
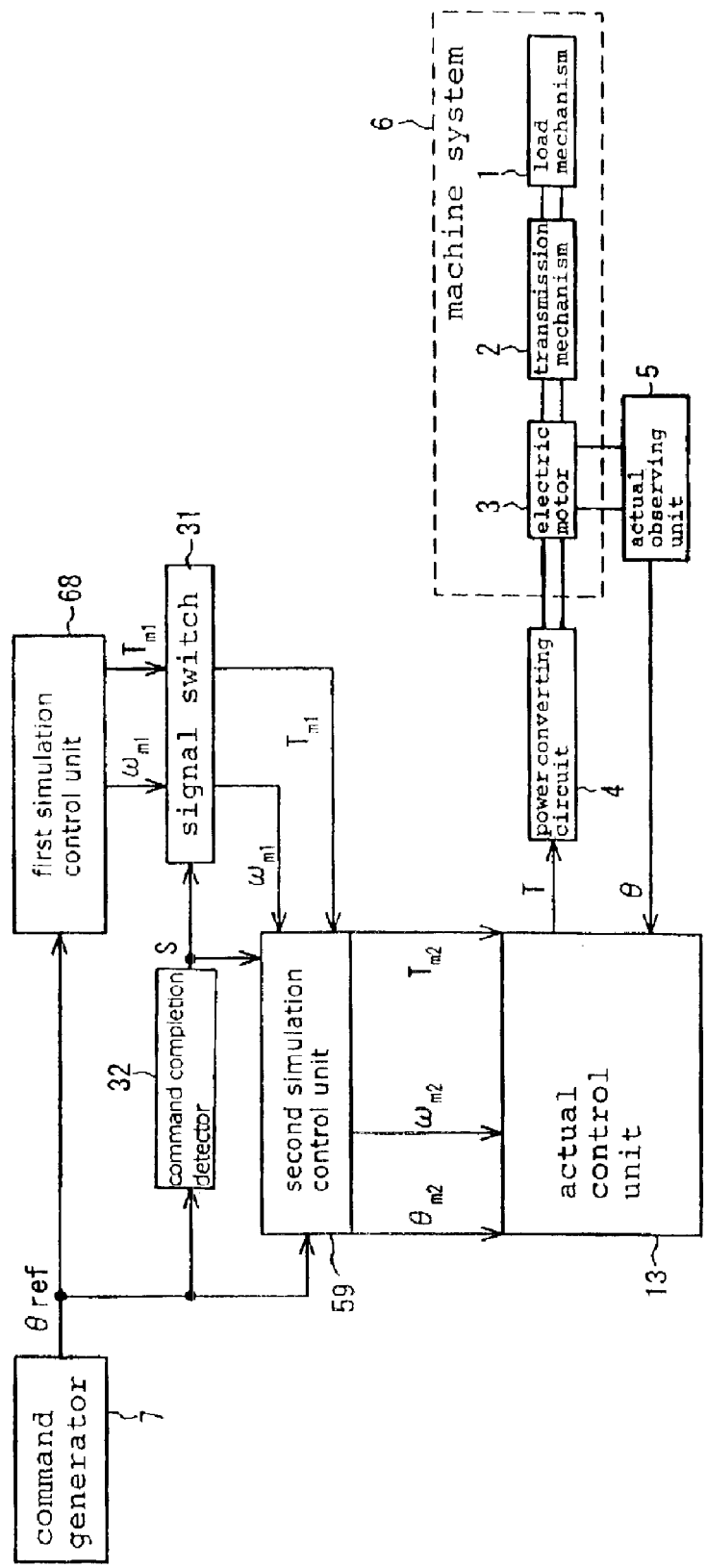
FIG. 38 is a block diagram illustrating the configuration of a motor controller according to a thirtieth embodiment of the present invention.

Next, description will be made on a motor controller according to a thirtieth embodiment of the present invention. FIG. 38 is a block diagram illustrating the configuration of the motor controller according to this embodiment. As illustrated in FIG. 38, the motor controller according to this embodiment differs from the motor controller of FIG. 36 in that command completion detector 32 is additionally provided.

Command completion detector 32 receives commanded rotation angle signal $\theta_{ref}$ provided from command generator 7, and provides command completion signal S. Command completion detector 32 sets command completion signal S to a first value (S<0, for example, −1) when a differentiated value of commanded rotation angle signal $\theta_{ref}$ is non-zero, i.e., when commanded rotation angle signal $\theta_{ref}$ is fluctuating. Also, command completion detector 32 sets command completion signal S provided therefrom to a second value (S=0) when a differentiated value of commanded rotation angle signal $\theta_{ref}$ is zero and a twice differentiated value of the same is non-zero, i.e., when the commanded rotation angle signal stops fluctuating. Further, command completion detector 32 sets command completion signal S to a third value (S>0, for example, one) when the differentiated value and twice differentiated value of commanded rotation angle signal $\theta_{ref}$ are both zero, i.e., when the commanded rotation angle signal is not fluctuating. Signal switch 31 and second simulation control unit 59 receive command completion signal S provided from command completion detector 31 to perform similar operations to those described in the twenty ninth embodiment.

As described above, the motor controller according to this embodiment, with command completion detector 32 provided therein, can automatically create command completion signal S for limiting overshooting and oscillations occurring in second simulation position signal $\theta_{m2}$.

In the motor controllers according to the twenty eighth through thirtieth embodiments, the actual control unit, first simulation control unit, and second simulation control unit may be comprised of a plurality of processors, wherein their respective operations may be implemented by software which runs on these processors. The motor controller according to each embodiment, when comprising a plurality of processors, can largely reduce a control processing time. The reduced control processing time results in a shorter delay of second simulation position signal $\theta_{m2}$ with respect to commanded rotation angle signal $\theta_{ref}$ and in reduced overshooting and oscillations occurring in second simulation position signal $\theta_{m2}$.

Description will be made on reference numerals shown in FIGS. 1 through 38.

1 load mechanism;
2 transmission mechanism;
3 electric motor;
4 power converting circuit;
5 actual observing unit;
6 machine system;
7, 17 command generators;
8, 28, 38, 48, 58, 68 first simulation control units;
8a, 68a, 78a, 88a, 98a first simulation controllers;
8a1, 8a12 first a simulation position control units;
8a1a subtractor;
8a1b, 8a1c coefficient multipliers;
8a1d integrator;
8a1e adder;
8a2, 8a22 first a simulation speed control units;
8a2a subtractor;
8a2b, 8a2c coefficient multipliers;
8a2d integrator;
8a2e adder;
8a3, 8a32 first b simulation position control units;
8a3a subtractor;
8a3b, 8a3c coefficient multipliers;
8a3d integrator;
8a3e adder;
8a4, 8a42 first b simulation speed control units;
8a4a differentiator;
8a4b subtractor;
8a4c, 8a4f coefficient multipliers;
8a4d integrator;
8a4e, 8a5 adders;
8a6 first a simulation limiter;
8a7 first b simulation limiter;
8b, 138b first a numerical models;
8b1 coefficient multiplier;
8b2, 8b3 integrators;
8c first command processor;
8d first simulation signal processor;
8e second simulation signal processor;
8f second command processor;
8g third simulation signal processor;
8h fourth simulation signal processor;
8i, 148i first b numerical models;
8i1 coefficient multiplier;
8i2, 8i3 integrators;
8j fifth simulation signal processor;
9, 19, 29, 39, 49, 59 second simulation control units;
9a, 29a 2a-th simulation controllers;
9a1 subtractor;
9a2 second a simulation position control unit;
9a3 subtractor;
9a4 adder;
9a5 coefficient multiplier;
9a6 second a simulation speed control unit;
9a7 differentiator;
9a8 subtractor;
9a9 second a simulation acceleration control unit;
9b, 179b second numerical models;
9b1 coefficient multiplier;
9b2, 9d3 integrators;
9c, 19c second b simulation controllers;
9c7 subtractor;
9c8 second b simulation acceleration control unit;
9d, 29d second c simulation controllers;
9d1 subtractor;
9d2 second a simulation position control unit;
9d2a coefficient multiplier;
9d3 subtractor;
9d4 adder;
9d5 coefficient multiplier;
9d6 second a simulation speed control unit;
9d6a coefficient multiplier;
9d subtractor;
9d8 second a simulation torsional speed compensator;
9d8a coefficient multiplier;
9d9 subtractor;
9d10 second a simulation torsional position compensator;
9d10a coefficient multiplier;
9d11 differentiator;
9d12 subtractor;
9d13 second b simulation acceleration control unit;
9e, 19e second b numerical models;
9e1 first inertia numerical model;
9e2 spring numerical model;
9e2a subtractor;
9e2b coefficient multiplier;
9e3 second inertia numerical model;
10, 11, 12, 13 actual control units;
10a subtractor;
10b actual position control unit;
10c subtractor;
10d, 10e differentiators;
10f actual speed control unit;
10g subtractor;
10h first actual acceleration control unit;
10i adder;
10j filter;
$10_k$ pseudo differentiator;
21 motor rotation angle command signal generator circuit;
22 A control circuit;
23 B control circuit;
24 two-inertia-system simulation circuit;
25 feed forward signal processing circuit;

31 signal switch;
32 command completion detector.

What is claimed is:

1. A motor controller for controlling a machine system having a power converting circuit which operates to drive an electric motor coupled to a load mechanism through a transmission mechanism in response to a torque command, and actual observing unit which provides an actual rotation angle signal and an actual speed signal of said electric motor, said motor controller characterized by comprising:

first simulation control means for calculating a first simulation position signal, a first simulation speed signal and a first simulation acceleration signal based on a commanded rotation angle signal provided from an upper rank apparatus and at least one first control parameter, to provide the calculated signals;

second simulation control means for calculating a second simulation position signal, a second simulation speed signal, a second simulation acceleration signal and a simulation torque signal based on said first simulation position signal, said first simulation speed signal, said first simulation acceleration signal and at least one second control parameter to provide the calculated signals; and actual control means for performing a feedback control based on said second simulation position signal, said second simulation speed signal, said second simulation acceleration signal and said simulation torque signal to calculate and provide said torque command.

2. The motor controller according to claim 1, wherein:

said first simulation control means provides an output of a two-stage first-order lag filter having a first time constant which receives said commanded rotation angle signal as said first simulation position signal, provides a differentiated signal of the output of said two-stage first-order lag filter as said first simulation speed signal, and provides a differentiated signal of the output of said two-stage first-order lag filter as said first simulation speed signal; and said second simulation control means provides an output of a first-order lag filter having a second time constant which receives said first simulation position signal as said second simulation position signal, provides an output of a first-order lag filter having the second time constant which receives said first simulation speed signal as said second simulation speed signal, and provides an output of a first-order lag filter having the second time constant which receive said first simulation acceleration signal as said second simulation acceleration signal.

3. The motor controller according to claim 1, wherein said first simulation control means comprises:

a first command processor for providing an output of a two-stage first-order lag filter having a first time constant which receives said commanded rotation angle signal as said first simulation position signal;

a first simulation signal processor for providing an integrated signal of said first simulation speed signal as said first simulation position signal; and a second simulation signal processor for providing a differentiated signal of said first simulation speed signal as said first simulation acceleration signal.

4. The motor controller according to claim 1, wherein said first simulation control means comprises:

a second command processor for providing an output of a two-stage first-order lag filter having a first time constant which receives said commanded rotation angle signal as said first simulation position signal;

a third simulation signal processor for differentiating said first simulation position signal to provide said first simulation speed signal; and a fourth simulation signal processor for differentiating said first simulation speed signal to provide said first simulation acceleration signal.

5. The motor controller according to claim 1, wherein:

said first simulation control means comprises:

a first simulation controller for calculating a first simulation torque signal based on a deviation of said first simulation position signal from said commanded rotation angle signal, and said first simulation speed signal; and a first numerical model for calculating said first simulation acceleration signal, said first simulation speed signal and said first simulation position signal based on said first simulation torque signal.

6. The motor controller according to claim 5, wherein:

said first simulation controller multiplies the deviation of said first simulation position signal from said commanded rotation angle signal by a first control gain to generate a first signal, multiplies said first simulation speed signal by a second control gain to generate a second signal, and multiplies a difference between said first signal and said second signal by a first inertia to provide the product signal as said first simulation torque signal; and said first numerical model subtracts said first inertia from said first simulation torque signal to generate a signal which is provided as said first simulation acceleration signal, integrates said first simulation acceleration signal to generate a signal which is provided as said first simulation speed signal, and integrates said first simulation speed signal to generate a signal which is provided as said first simulation position signal.

7. The motor controller according to claim 6, wherein said first numerical model comprises:

a coefficient multiplier for subtracting an inertia from said first simulation torque signal to provide the difference signal as said first simulation acceleration signal;

an integrator for integrating said first simulation acceleration signal to provide the integrated signal as said first simulation speed signal; and an integrator for integrating said first simulation speed signal to provide the integrated signals said first simulation position signal.

8. The motor controller according to claim 5, wherein said first simulation controller comprises a first simulation position control unit for providing said first simulation speed command signal based on a deviation of the first simulation position signal from said commanded rotation angle signal; and a first simulation speed control unit for providing said first simulation torque signal based on a deviation of said first simulation speed signal from said first simulation speed command signal.

9. The motor controller according to claim 8, wherein:

said first simulation position control unit multiplies a deviation of said first simulation position signal from said commanded rotation angle signal by a first position proportional control gain to provide the product signal as said first simulation speed command signal; and said first simulation speed control unit multiplies the deviation of said first simulation speed signal from said first simulation speed command signal by a first speed proportional control gain to provide the product signal as said first simulation torque signal.

10. The motor controller according to claim 8, wherein said first simulation position control unit comprises:
- a subtractor for subtracting said first simulation position signal from said commanded rotation angle signal to provide the difference signal as a first simulation position error signal;
- a coefficient multiplier for amplifying said first simulation position error signal by a first position proportional control gain to provide the amplified signal as a tenth simulation signal;
- a coefficient multiplier for amplifying said first simulation position error signal by a first position integral control gain to provide the amplified signal as an eleventh simulation signal;
- an integrator for integrating said eleventh simulation signal to provide the integrated signal as a twelfth simulation signal; and
- an adder for adding said tenth simulation signal and said twelfth simulation signal to provide the sum signal as said first simulation speed command signal.

11. The motor controller according to claim 5, wherein said first simulation controller comprises:
- a first simulation position control unit for providing as a first simulation torque command signal based on a deviation of said first simulation position signal from said commanded rotation angle signal;
- a first simulation speed control unit for providing as a second simulation torque command signal based on a deviation of the first simulation speed signal from the commanded rotation angle signal; and
- an adder for adding said first simulation torque command signal and said second simulation torque command signal to provide the sum signal as said first simulation torque signal.

12. The motor controller according to claim 11, wherein:
- said first simulation position control unit multiplies the deviation of said first simulation position signal from said commanded rotation angle signal by a first position proportional control gain to provide the product signal as said first simulation torque command signal; and
- said first simulation speed control unit multiplies the deviation of said first simulation speed signal from said commanded rotation angle signal by a first speed proportional control gain to provide the product signal as said second simulation torque command signal.

13. The motor controller according to claim 11, wherein said first simulation position control unit comprises:
- a subtractor for subtracting said first simulation position signal from said commanded rotation angle signal to provide the difference value signal as a first simulation position error signal;
- a coefficient multiplier for amplifying the value of said first simulation position error signal by a first position proportional control gain to provide the amplified signal as a sixteenth simulation signal;
- a coefficient multiplier for amplifying the value of said first simulation position error signal by a first position integral control gain to provide the amplified signal as a seventeenth simulation signal;
- an integrator for integrating said seventeenth simulation signal to provide the integrated signal as an eighteenth simulation signal; and
- an adder for adding said sixteenth simulation signal and said eighteenth simulation signal to provide the sum signal as the first simulation torque command signal.

14. The motor controller according to claim 1, wherein said first simulation control means comprises:
- a first simulation controller for calculating a first simulation torque signal based on a deviation of said first simulation position signal from said commanded rotation angle signal, and said first simulation speed signal;
- a first numerical model for calculating said first simulation speed signal and said first simulation position signal based on said first simulation torque signal; and
- a fifth simulation signal processor for differentiating an output of a first-order filter having a third time constant which receives said first simulation speed signal, to provide the differentiated signal as said first simulation acceleration signal.

15. The motor controller according to claim 14, wherein:
- said first simulation controller multiplies the deviation of said first simulation position signal from said commanded rotation angle signal by a first control gain to generate a first signal, multiplies said first simulation speed signal by a second control gain to generate a second signal, and multiplies a difference between said first signal and said second signal by a first inertia to provide the product signal as said first simulation torque signal; and
- said first numerical model divides said first simulation torque signal by said first inertia, integrates the quotient signal to provide the integrated signal as said first simulation speed signal, and integrates said first simulation speed signal to provide the integrated signal as said first simulation position signal.

16. The motor controller according to claim 15, wherein said first numerical model comprises:
- a coefficient multiplier for subtracting an inertia from said first simulation torque signal to provide the difference signal as a sixteenth simulation signal;
- an integrator for integrating said sixteenth simulation signal to provide the integrated signal as said first simulation speed signal; and
- an integrator for integrating said first simulation speed signal to provide the integrated signal as said first simulation position signal.

17. The motor controller according to claim 1 or 3, wherein said second simulation control means comprises:
- a second simulation controller for calculating said second simulation torque signal based on a deviation of said second simulation position signal from said first simulation position signal, a deviation of said second simulation speed signal from said first simulation speed signal, and a deviation of said second simulation acceleration signal from said first simulation acceleration signal to provide said second simulation torque signal; and
- a second numerical model for calculating said second simulation acceleration signal, said second simulation speed signal and said second simulation position signal based on said second simulation torque signal to provide the calculated signals.

18. The motor controller according to claim 1 or 3, wherein said second simulation control means comprises:
- a second numerical model for providing said second simulation position signal, said second simulation speed signal, said second simulation acceleration signal, a third simulation position signal and a third simulation speed signal based on said second simulation torque signal; and a second simulation controller for calculating said second simulation torque signal based on said second simulation position signal, said second simulation speed signal, said second simulation acceleration signal, said third simulation position signal and said third simulation speed signal.

19. The motor controller according to claim 18, wherein:
said second simulation controller multiplies a deviation of said second simulation position signal from said first simulation position signal by a third control gain to generate a first signal, multiplies a deviation of said second simulation speed signal from said first simulation speed signal by a fourth control gain to generate a second signal, subtracts said second signal from said first signal and multiplies the difference signal by a third inertia to generate a third signal, multiplies said first simulation acceleration signal by a second inertia to generate a fourth signal, multiplies said second simulation acceleration signal by a fourth inertia to generate a fifth signal, multiplies said third simulation position signal by a fifth control gain to generate a sixth signal, multiplies said third simulation speed signal by a sixth control gain to generate a seventh signal, and subtracts said fifth signal, said sixth signal and said seventh signal from the sum of said fourth signal and said third signal to provide the difference signal as said second simulation torque signal; and said second numerical model receives said second simulation torque signal, multiplies a deviation of said third simulation position signal from said second simulation position signal by a spring constant to generate the product signal as a simulation torsional torque signal, divides said simulation torsional torque signal by a sixth inertia, and integrates the quotient signal to provide the integrated signal as said third simulation speed signal, divides said simulation torsional torque signal by said sixth inertia, and integrates the quotient signal twice to provide the twice integrated signal as said third simulation position signal, divides a deviation of said simulation torsional torque signal from said second simulation torque signal by a fifth inertia to provide the quotient signal as said second simulation acceleration signal, divides a deviation of said simulation torsional torque signal from said second simulation torque signal by said fifth inertia and integrates the quotient signal to provide the integrated signal as said second simulation speed signal, divides the deviation of said simulation torsional torque signal from said second simulation torque signal by said fifth inertia and integrates the quotient signal twice to provide the twice integrated signal as said second simulation position signal.

20. The motor controller according to claim 18, wherein:
said second simulation controller comprises:
a subtractor for subtracting said third simulation position signal from said first simulation position signal to provide a twenty seventh simulation signal;
a second simulation position control unit for multiplying said twenty seventh simulation signal by a second position proportional control gain to provide the product signal as a twenty eighth simulation signal;
an adder/subtractor for subtracting said third simulation speed signal from the sum of said twenty eighth simulation signal and said first simulation speed signal to provide the difference signal as a twenty ninth simulation signal;

a second simulation speed control unit for multiplying said twenty ninth simulation signal by a second speed proportional control gain to provide the product signal as a thirtieth simulation signal;
a subtractor for subtracting said third simulation position signal from said second simulation position signal to provide the difference signal as a thirty first simulation signal;
a second simulation torsional position compensator for multiplying said thirty first simulation signal by a third position proportional control gain to provide the product signal as a thirty second simulation signal;
a subtractor for subtracting said third simulation speed signal from said second simulation speed signal to provide the difference signal as a thirty third simulation signal;
a second simulation torsional speed compensator for multiplying said thirty third simulation signal by a third speed-proportional control gain to provide the product signal as a thirty fourth simulation signal;
a coefficient multiplier for multiplying said first simulation acceleration signal by a second acceleration proportional control gain to provide the product signal as a thirty fifth simulation signal; and
an adder for adding said thirtieth simulation signal, said thirty second simulation signal, said thirty fourth simulation signal and said thirty fifth simulation signal to provide the sum signal as said second simulation torque signal.

21. The motor controller according to claim 20, wherein said second simulation controller further comprises:
a differentiator for differentiating said third simulation speed signal to provide a thirty sixth simulation signal;
a subtractor for subtracting said thirty sixth simulation signal from said first simulation acceleration signal to provide a thirty seventh simulation signal;
a second simulation acceleration control unit for multiplying said thirty seventh signal by a third acceleration proportional control gain to provide the product signal as a thirty eighth simulation signal; and
an adder for adding said thirty simulation signal, said thirty second simulation signal, said thirty fourth simulation signal, said thirty fifth simulation signal and said thirty eighth simulation signal to provide the sum signal as said second simulation torque signal.

22. The motor controller according to claim 18, wherein said second numerical model comprises:
a spring numerical model for multiplying the deviation of said third simulation position signal from said second simulation position signal by a spring constant to provide the product signal as a simulation torsional torque signal;
a first inertia system numerical model for dividing the deviation of said simulation torsional torque signal from said second simulation torque signal by a fifth inertia to provide the quotient signal as said second simulation acceleration signal, integrating said second simulation acceleration signal to provide the integrated signal as said second simulation speed signal, and integrating said second simulation speed signal to provide the integrated signal as said second simulation position signal; and
a second inertia system numerical model for dividing said simulation torsional torque signal by the sixth inertia and integrating the quotient signal to provide the integrated signal as said third simulation speed signal, and integrating said third simulation speed signal to provide the integrated signal as said third simulation position signal.

23. The motor controller according to claim 1 or 3, wherein said actual control means comprises:
   a subtractor for subtracting said actual rotation angle signal from said second simulation position signal to provide the difference signal as a thirty ninth simulation signal;
   an actual position controller for receiving said thirty ninth simulation signal to perform a position control to provide a fortieth simulation signal;
   a differentiator for differentiating said actual rotation angle signal to provide a forty third simulation signal;
   a subtractor for subtracting said forty third simulation signal from the sum of said second simulation speed signal and said fortieth simulation signal to provide a forty first simulation signal;
   an actual speed controller for differentiating said forty first simulation signal to provide the differentiated signal as a forty second simulation signal;
   a differentiator for differentiating said forty third simulation signal to provide the differentiated signal as a forty forth simulation signal;
   a subtractor for subtracting said forty fourth simulation signal from said second simulation acceleration signal to provide the difference signal as a forty fifth simulation signal;
   a first actual acceleration controller for receiving said forty fifth simulation signal, and amplifying said forty fifth simulation signal by a first acceleration proportional control gain to provide the amplified signal as a forty sixth simulation signal; and
   an adder for adding said forty second simulation signal, said forty sixth simulation signal and said second simulation torque signal to provide the sum signal as an actual torque command.

24. The motor controller according to claim 23, wherein said differentiator for differentiating said actual rotation angle signal to provide a forty third simulation signal is a pseudo differentiator which comprises first-order filter having a fifth time constant.

25. The motor controller according to claim 1 or 3, wherein said actual rotation angle signal employed therein passes through a first-order filter having a fourth time constant.

26. The motor controller according to claim 1 or 3, comprising software running on a plurality of processors.

27. The motor controller according to any of claims 1, 3, 4 or 14, wherein said second simulation control means comprises:
   a second simulation controller for calculating said second simulation torque signal based on a deviation of said second simulation position signal from said first simulation position signal, a deviation of said second simulation speed signal from said first simulation speed signal and said first simulation acceleration signal to provide said simulation torque signal; and
   a second numerical model for calculating said second simulation acceleration signal, said second simulation speed signal and said simulation position signal based on said second simulation torque signal to provide the calculated signals.

28. The motor controller according to claim 27, wherein:
   said second simulation controller multiplies the deviation of said second simulation position signal from said first simulation position signal by a third control gain to generate a first signal, multiplies the deviation of said second simulation speed signal from said first simulation speed signal by a fourth control gain to generate a second signal, subtracts said second signal from said first signal and multiplies the difference signal by a third inertia to generate a third signal, multiplies said first simulation acceleration signal by a second inertia to generate a fourth signal, and adds said fourth signal and said third signal to provide the sum signal as said second simulation torque signal; and
   said second numerical model divides said second simulation torque signal by said third inertia to provide the quotient signal as said second simulation acceleration signal, integrates said second simulation acceleration signal to provide the integrated signal as said second simulation speed signal, and integrates said second simulation speed signal to provide the integrated signal as the second simulation position signal.

29. The motor controller according to claim 27, wherein said second simulation controller comprises:
   a subtractor for subtracting said second simulation position signal from said first simulation position signal to provide a seventeenth simulation signal;
   a second simulation position control unit for amplifying said seventeenth simulation signal by a second position proportional control gain to provide an eighteenth simulation signal;
   an adder/subtractor for subtracting said second simulation speed signal from the sum of said eighteenth simulation signal and said first simulation speed signal to provide the difference signal as a nineteenth simulation signal;
   a second simulation speed control unit for amplifying said nineteenth simulation signal by a second speed-proportional control gain to provide a twentieth simulation signal;
   a coefficient multiplier for multiplying first simulation acceleration signal by a second inertia to provide the product signal as a twenty first simulation signal; and
   an adder for adding said twentieth simulation signal and said twenty first simulation signal to provide the sum signal as said second simulation torque signal.

30. The motor controller according to claim 29, wherein said second simulation controller further comprises:
   a differentiator for differentiating said second simulation speed signal to provide a twenty second simulation signal;
   a subtractor for subtracting the twenty second simulation signal from said first simulation acceleration signal to provide a twenty third simulation signal;
   a second simulation acceleration control unit for amplifying said twenty third simulation signal by an acceleration proportional control gain to provide the amplified signal as a twenty fourth simulation signal; and
   an adder for adding said twenty fourth simulation signal, said twentieth simulation signal and said twenty first simulation signal to provide the sum signal as said second simulation torque signal.

31. The motor controller according to claim 29, wherein:
   said second simulation controller multiplies the deviation of said second simulation position signal from said first simulation position signal by a third control gain to generate a first signal, multiplies the deviation of said second simulation speed signal from said first simulation speed signal by a fourth control gain to generate a second signal, and subtracts said second signal from said first signal and multiplies the difference signal by a third inertia to generate a third signal, multiplies said first simulation acceleration signal by a second inertia to generate a fourth signal, multiplies said second simulation acceleration signal by a fourth inertia to generate a fifth signal, and subtracts said fifth signal from the sum of said fourth signal and said third signal to provide the difference signal as said second simulation torque signal, and said second numerical model divides said second simulation torque signal by said third inertia to provide the quotient signal as said second simulation acceleration signal, integrates said second simulation acceleration signal to provide the integrated signal as said second simulation speed signal, and integrates said second simulation speed signal to provide the integrated signal as said second simulation position signal.

32. The motor controller according to claim 29, wherein said second simulation controller comprises:

a subtractor for subtracting said second simulation position signal from said first simulation position signal to provide a seventeenth simulation signal;

a second simulation position control unit for amplifying said seventeenth simulation signal by a second position proportional control gain to provide an eighteenth simulation signal;

an adder/subtractor for subtracting said second simulation speed signal from the sum of said eighteenth simulation signal and said first simulation speed signal to provide the difference signal as a nineteenth simulation signal;

a second simulation speed control unit for amplifying said nineteenth simulation signal by a second speed proportional control gain to provide a twentieth simulation signal;

a coefficient multiplier for multiplying said first simulation acceleration signal by a second inertia to provide the product signal as a twenty first simulation signal;

a subtractor for subtracting said first simulation acceleration signal from said second simulation acceleration signal to provide a twenty fifth simulation signal;

a second simulation acceleration control unit for amplifying said twenty fifth simulation signal by an acceleration proportional control gain to provide a twenty sixth simulation signal; and an adder for adding said twenty first simulation signal, said twenty sixth simulation signal and said twentieth simulation signal to provide the sum as the second simulation torque signal.

33. The motor controller according to claim 27, wherein said second numerical model comprises:

a coefficient multiplier for multiplying said second simulation torque signal by the inverse of the third inertia to provide said second simulation acceleration signal;

an integrator for integrating said second simulation acceleration signal to provide said second simulation speed signal; and an integrator for integrating said second simulation speed signal to provide said second simulation position signal.

34. The motor controller according to claim 5 or 6, wherein said first simulation controller further comprises a first simulation limiter for limiting the value of said first simulation torque signal such that said first simulation torque signal falls within a predetermined range of said electric motor.

35. The motor controller according to claim 8 or 10, wherein said first simulation speed control unit comprises:

a subtractor for subtracting said first simulation speed signal from said first simulation speed command signal to provide the difference signal as a first simulation speed error signal;

a coefficient multiplier for amplifying said first simulation speed error signal by a first speed-proportional control gain to provide the amplified signal as a thirteenth simulation signal;

a coefficient multiplier for amplifying said first simulation speed error signal by a first speed integral control gain to provide the amplified signal as a fourteenth simulation signal;

an integrator for integrating said fourteenth simulation signal to provide the integrated signal as a fifteenth simulation signal; and an adder for adding said thirteenth simulation signal and said fifteenth simulation signal to provide the sum signal as said first simulation torque command signal.

36. The motor controller according to claim 11 or 13, wherein said first simulation speed control unit comprises:

a differentiator for differentiating said commanded rotation angle signal to provide the differentiated signal as a nineteenth simulation signal;

a subtractor for subtracting said nineteenth simulation signal from said first simulation speed signal to provide a first simulation speed error signal;

a coefficient multiplier for amplifying said first simulation speed error signal by a first speed integral control gain to provide the amplified signal as a twentieth simulation signal;

a coefficient multiplier for amplifying said first simulation speed error signal by a first speed proportional control gain to provide the amplified signal as a twenty first simulation signal;

an integrator for integrating said twentieth simulation signal to provide a twenty second simulation signal; and an adder for adding said twenty first simulation signal and said twenty second simulation signal to provide the sum signal as said second simulation torque command signal.

37. A motor controller for controlling a machine system having a power converting circuit which operates to drive an electric motor coupled to a load mechanism through a transmission mechanism in response to a torque command, and actual observing unit which provides an actual response signal of said electric motor, said motor controller characterized by comprising:

first simulation control means for calculating a first simulation speed signal and a first simulation torque signal based on a commanded rotation angle signal provided from an upper rank apparatus and at least one control parameter to provide said first simulation speed signal and said first simulation torque signal;

second simulation control means for performing a proportional control based on a deviation of a second simulation position signal from said commanded rotation angle signal to calculate a value, performing an integral control based on the deviation of said second simulation position signal from said commanded rotation angle signal to calculate a value, performing a proportional control based on a deviation of a second simulation speed signal from said first simulation speed signal to calculate a value, and adding said values and the value of the first simulation torque signal to provide the sum as said second simulation torque signal; integrating said second simulation torque signal once to provide the integrated signal as the second simulation speed signal; and integrating said second simulation speed signal once to provide the integrated signal as the second simulation position signal; and actual control means for performing a feedback control based on said second simulation position signal, said second simulation speed signal and said second simulation torque signal to calculate and provide said torque command.

38. The motor controller according to claim 37, wherein said second simulation control means receives a command completion signal which takes a first value when said commanded rotation angle signal is fluctuating, takes a second value when said commanded rotation angle signal stops fluctuating, and takes a third value when said commanded rotation angle signal is not fluctuating, for setting zero to the value calculated by performing said integral control when said commanded rotation angle signal takes the second value.

39. The motor controller according to claim 38, further comprising:

a signal switch for applying said second simulation control means with said first simulation speed signal and said first simulation torque signal provided from said first simulation control means as they are when said command completion signal takes said first value; and setting zero to the value of said first simulation speed signal and the value of said first simulation torque signal applied to said second simulation control means when said command completion signal takes said second value or said third value.

40. The motor controller according to claim 39, further comprising:

a command completion detector for setting said first value to the value of said command completion signal when a differentiated value of said commanded rotation angle signal is non-zero;

setting said second value to the value of said command completion signal when the differentiated value of said commanded rotation angle signal is zero and a twice differentiated value of the same is non-zero; and setting said third value to the value of said command completion signal when the differentiated value and said twice differentiated value of said commanded rotation angle signal are both zero.

* * * * *

UNITED STATES PATENT AND TRADEMARK OFFICE
CERTIFICATE OF CORRECTION

| | | |
|---|---|---|
| PATENT NO. | : 6,914,404 B2 | |
| APPLICATION NO. | : 10/380557 | |
| DATED | : July 5, 2005 | |
| INVENTOR(S) | : Souki Kaku, Ryuichi Oguro and Hideki Honda | |

It is certified that error appears in the above-identified patent and that said Letters Patent is hereby corrected as shown below:

On title page Item (30), please add --(30) Foreign Application Priority Data: September 26, 2000 (JP), 2000-292217 and May 31, 2001, 2001-164873--.

Signed and Sealed this

Eighteenth Day of September, 2007

JON W. DUDAS
*Director of the United States Patent and Trademark Office*